US012574921B2

(12) United States Patent
Alfarhan et al.

(10) Patent No.: US 12,574,921 B2
(45) Date of Patent: *Mar. 10, 2026

(54) METHODS, APPARATUS AND SYSTEMS FOR UPLINK TRANSMISSION OF SMALL DATA

(71) Applicant: InterDigital Patent Holdings, Inc., Wilmington, DE (US)

(72) Inventors: Faris Alfarhan, Montreal (CA); Loic Canonne-Velasquez, Dorval (CA); Dylan Watts, Montreal (CA); Paul Marinier, Brossard (CA); Ghyslain Pelletier, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 487 days.

This patent is subject to a terminal disclaimer.

(21) Appl. No.: 17/917,031

(22) PCT Filed: Apr. 7, 2021

(86) PCT No.: PCT/US2021/026119
§ 371 (c)(1),
(2) Date: Oct. 5, 2022

(87) PCT Pub. No.: WO2021/207317
PCT Pub. Date: Oct. 14, 2021

(65) Prior Publication Data
US 2023/0164773 A1 May 25, 2023

Related U.S. Application Data

(60) Provisional application No. 63/093,996, filed on Oct. 20, 2020, provisional application No. 63/061,435,
(Continued)

(51) Int. Cl.
*H04W 72/1268* (2023.01)
*H04W 74/0833* (2024.01)
(Continued)

(52) U.S. Cl.
CPC ... *H04W 72/1268* (2013.01); *H04W 74/0833* (2013.01); *H04W 74/0836* (2024.01); *H04W 74/0838* (2024.01)

(58) Field of Classification Search
CPC ...................... H04W 72/1268; H04W 74/0833
See application file for complete search history.

(56) References Cited

U.S. PATENT DOCUMENTS

2015/0003375 A1   1/2015   Liu et al.
2018/0310309 A1   10/2018   Koskela et al.
(Continued)

FOREIGN PATENT DOCUMENTS

TW        202014009 A     4/2020
WO    WO 2019134593 A1    7/2019
(Continued)

OTHER PUBLICATIONS

VIVO, "Views on NR small data transmission enhancements in Rel-17", 3GPP Tdoc RP-192549, 3GPP TSG-RAN Meeting #86, Sitges, Spain, Dec. 9-12, 2019, 3 pages.

*Primary Examiner* — Siren Wei
(74) *Attorney, Agent, or Firm* — Jamie T. Nguyen

(57) ABSTRACT

Methods for resource efficient data transmission are described herein. A method may comprise operating in one of an idle or an inactive mode and transmitting, in response to a random access (RA) message or a configured grant (CG), a small data transmission over an uplink channel. The RA message may be received in a two-step RA procedure or a four-step RA procedure. The method may further comprise transitioning from the idle or the inactive mode to a con-
(Continued)

nected mode. The method may further comprise determining resources for transmitting the small data transmission. The method may comprise determining whether the small data transmission was successfully received and retransmitting, on a condition the small data transmission was not received, the small data transmission. The method may further comprise segmenting a small data packet into a plurality of small data packets and transmitting the small data packets in a plurality of transmission opportunities.

20 Claims, 14 Drawing Sheets

Related U.S. Application Data filed on Aug. 5, 2020, provisional application No. 63/007,166, filed on Apr. 8, 2020.

(51) Int. Cl.
    *H04W 74/0836*        (2024.01)
    *H04W 74/0838*        (2024.01)

(56)                References Cited

U.S. PATENT DOCUMENTS

| | | | |
|---|---|---|---|
| 2020/0037345 | A1 | 1/2020 | Ryoo et al. |
| 2020/0053791 | A1 | 2/2020 | Ozturk et al. |
| 2020/0092073 | A1 | 3/2020 | Papasakellariou et al. |
| 2020/0107295 | A1* | 4/2020 | Lee ................... H04W 56/0045 |
| 2021/0068164 | A1* | 3/2021 | Sato .................. H04W 56/0045 |
| 2021/0160949 | A1* | 5/2021 | Kim ...................... H04W 76/27 |
| 2021/0211994 | A1 | 7/2021 | Shih et al. |
| 2021/0243777 | A1* | 8/2021 | Tsai .................... H04W 74/006 |
| 2022/0070922 | A1* | 3/2022 | Talarico ............ H04W 72/1268 |
| 2023/0030443 | A1* | 2/2023 | Chen .................... H04W 72/23 |

FOREIGN PATENT DOCUMENTS

| | | |
|---|---|---|
| WO | WO 2019217829 A1 | 11/2019 |
| WO | WO 2020034560 A1 | 2/2020 |

* cited by examiner

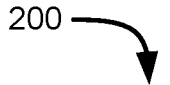

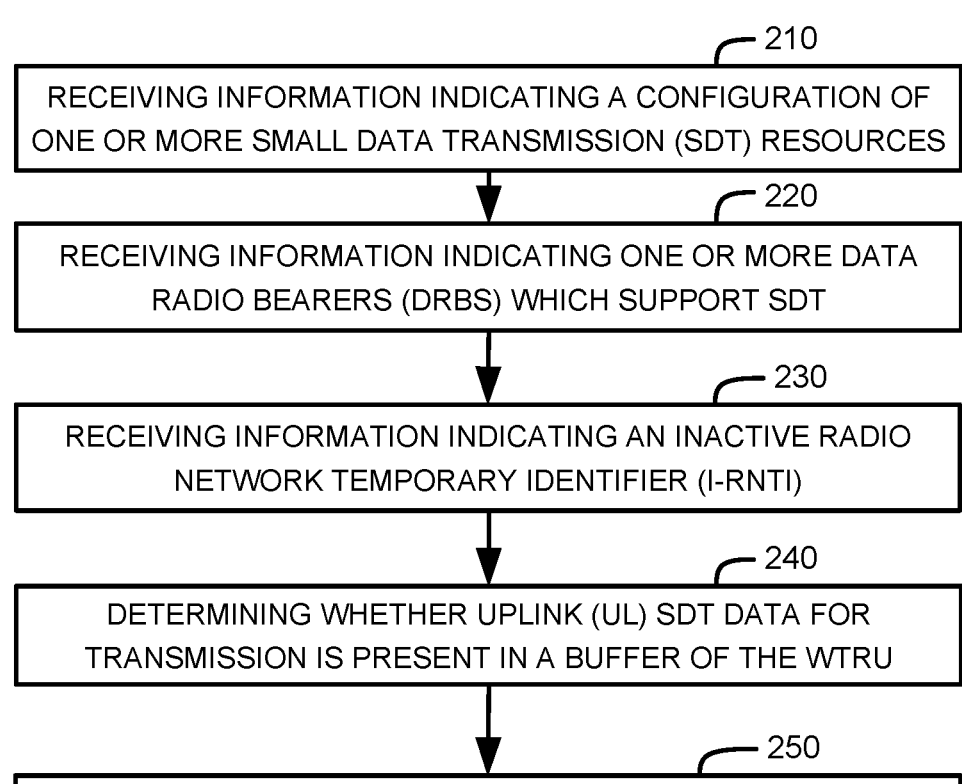

210
RECEIVING INFORMATION INDICATING A CONFIGURATION OF
ONE OR MORE SMALL DATA TRANSMISSION (SDT) RESOURCES

220
RECEIVING INFORMATION INDICATING ONE OR MORE DATA
RADIO BEARERS (DRBS) WHICH SUPPORT SDT

230
RECEIVING INFORMATION INDICATING AN INACTIVE RADIO
NETWORK TEMPORARY IDENTIFIER (I-RNTI)

240
DETERMINING WHETHER UPLINK (UL) SDT DATA FOR
TRANSMISSION IS PRESENT IN A BUFFER OF THE WTRU

250
ON CONDITION THAT (1) THE UL SDT DATA IS
DETERMINED TO BE PRESENT IN THE BUFFER, (2) A SIZE OF
THE UL SDT DATA PRESENT IN THE BUFFER IS LESS THAN A
FIRST THRESHOLD, AND (3) THE UL SDT DATA PRESENT IN THE
BUFFER IS FOR THE ONE OR MORE DRBS WHICH SUPPORT
SDT:
    AFTER RECEIVING THE INFORMATION INDICATING THE I-
RNTI, TRANSMITTING AT LEAST A PORTION OF THE UL SDT
DATA PRESENT IN THE BUFFER USING A SDT RESOURCE FROM
AMONG THE ONE OR MORE SDT RESOURCES

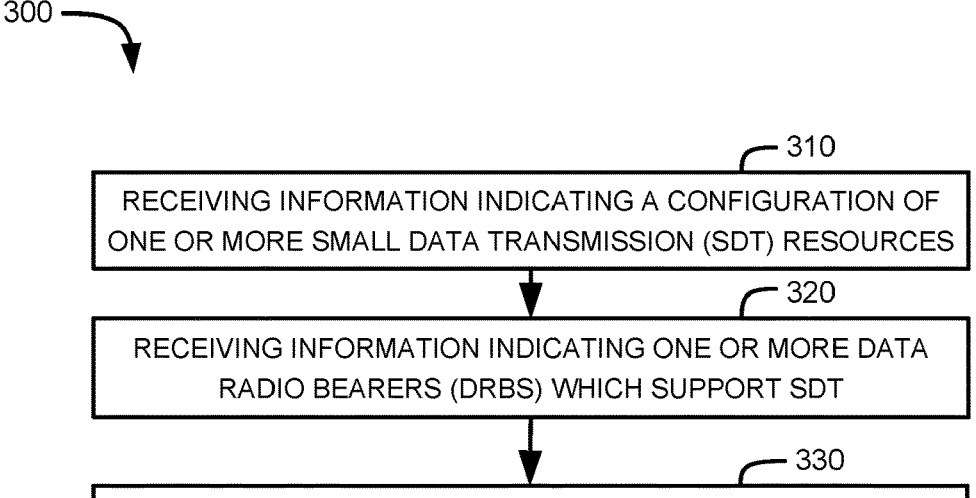

310

RECEIVING INFORMATION INDICATING A CONFIGURATION OF ONE OR MORE SMALL DATA TRANSMISSION (SDT) RESOURCES

320

RECEIVING INFORMATION INDICATING ONE OR MORE DATA RADIO BEARERS (DRBS) WHICH SUPPORT SDT

330

RECEIVING INFORMATION INDICATING AN INACTIVE RADIO NETWORK TEMPORARY IDENTIFIER (I-RNTI)

340

DETERMINING WHETHER UPLINK (UL) SDT DATA FOR TRANSMISSION IS PRESENT IN A BUFFER OF THE WTRU

350

ON CONDITION THAT (1) THE UL SDT DATA IS DETERMINED TO BE PRESENT IN THE BUFFER, (2) A SIZE OF THE UL SDT DATA PRESENT IN THE BUFFER IS LESS THAN A FIRST THRESHOLD, AND (3) THE UL SDT DATA PRESENT IN THE BUFFER IS FOR THE ONE OR MORE DRBS WHICH SUPPORT SDT:
    AFTER RECEIVING THE INFORMATION INDICATING THE I-RNTI, TRANSMITTING THE UL SDT DATA PRESENT IN THE BUFFER USING A SDT RESOURCE FROM AMONG THE ONE OR MORE SDT RESOURCES

FIG. 3

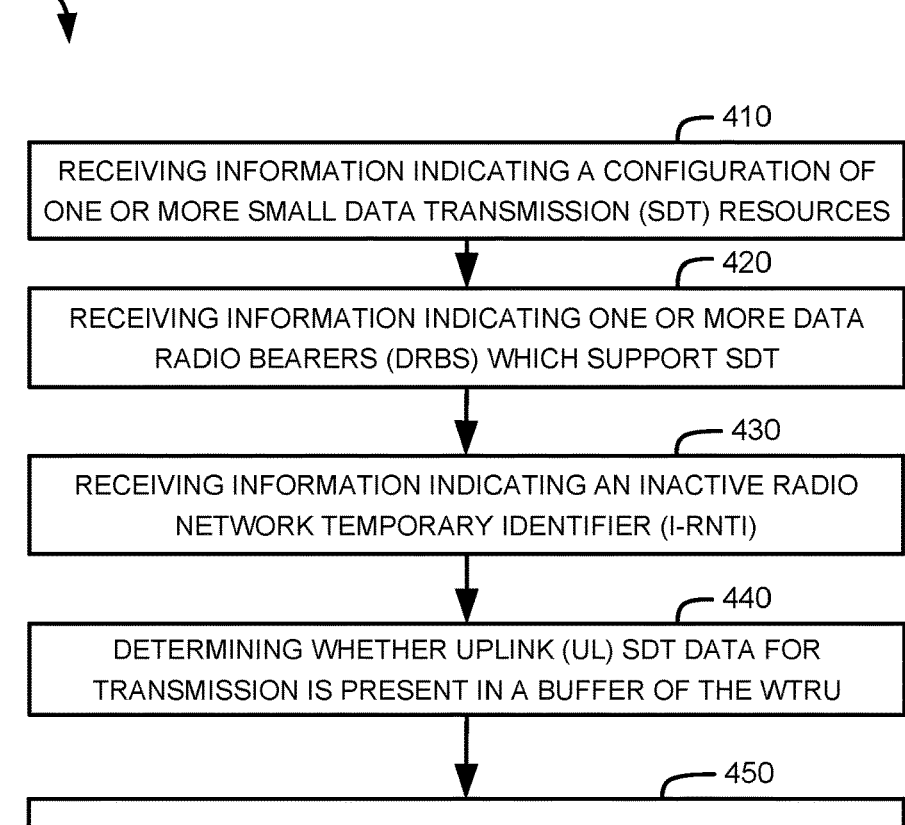

400

410
RECEIVING INFORMATION INDICATING A CONFIGURATION OF ONE OR MORE SMALL DATA TRANSMISSION (SDT) RESOURCES

420
RECEIVING INFORMATION INDICATING ONE OR MORE DATA RADIO BEARERS (DRBS) WHICH SUPPORT SDT

430
RECEIVING INFORMATION INDICATING AN INACTIVE RADIO NETWORK TEMPORARY IDENTIFIER (I-RNTI)

440
DETERMINING WHETHER UPLINK (UL) SDT DATA FOR TRANSMISSION IS PRESENT IN A BUFFER OF THE WTRU

450
ON CONDITION THAT (1) AT LEAST A PORTION OF THE UL SDT DATA PRESENT IN THE BUFFER IS FOR A DRB WHICH DOES NOT SUPPORT SDT, OR (2) THE UL SDT DATA PRESENT IN THE BUFFER IS FOR THE ONE OR MORE DRBS WHICH SUPPORT SDT AND A SIZE OF THE UL SDT DATA PRESENT IN THE BUFFER IS GREATER THAN OR EQUAL TO A FIRST THRESHOLD:
SENDING A REQUEST TO RESUME A RADIO RESOURCE CONTROL (RRC) CONNECTION TO A RADIO ACCESS NETWORK (RAN), THE REQUEST TO RESUME THE RRC CONNECTION INCLUDING THE INFORMATION INDICATING THE I-RNTI

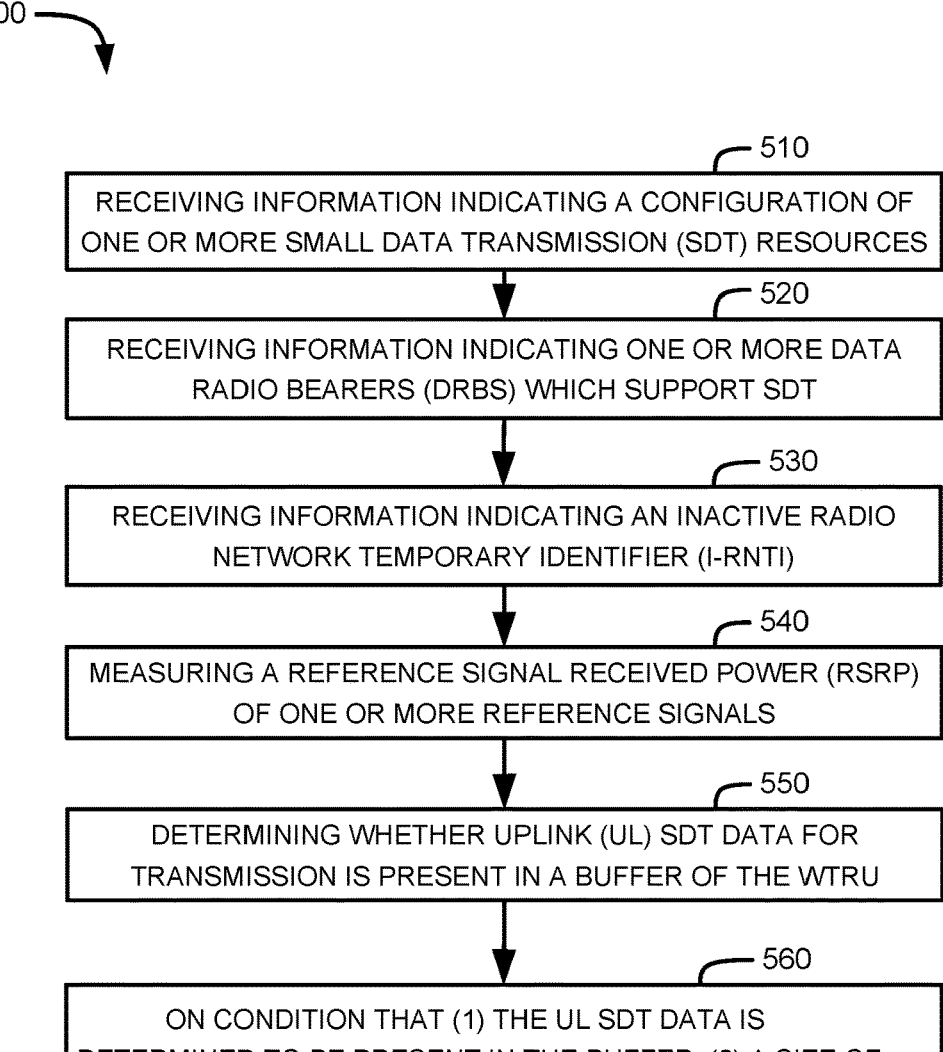

510

RECEIVING INFORMATION INDICATING A CONFIGURATION OF ONE OR MORE SMALL DATA TRANSMISSION (SDT) RESOURCES

520

RECEIVING INFORMATION INDICATING ONE OR MORE DATA RADIO BEARERS (DRBS) WHICH SUPPORT SDT

530

RECEIVING INFORMATION INDICATING AN INACTIVE RADIO NETWORK TEMPORARY IDENTIFIER (I-RNTI)

540

MEASURING A REFERENCE SIGNAL RECEIVED POWER (RSRP) OF ONE OR MORE REFERENCE SIGNALS

550

DETERMINING WHETHER UPLINK (UL) SDT DATA FOR TRANSMISSION IS PRESENT IN A BUFFER OF THE WTRU

560

ON CONDITION THAT (1) THE UL SDT DATA IS DETERMINED TO BE PRESENT IN THE BUFFER, (2) A SIZE OF THE UL SDT DATA PRESENT IN THE BUFFER IS LESS THAN A FIRST THRESHOLD, (3) THE UL SDT DATA PRESENT IN THE BUFFER IS FOR THE ONE OR MORE DRBS WHICH SUPPORT SDT, AND (4) THE MEASURED RSRP IS GREATER THAN OR EQUAL TO A SECOND THRESHOLD:

AFTER RECEIVING THE INFORMATION INDICATING THE I-RNTI, TRANSMITTING THE UL SDT DATA PRESENT IN THE BUFFER USING A SDT RESOURCE FROM AMONG THE ONE OR MORE SDT RESOURCES

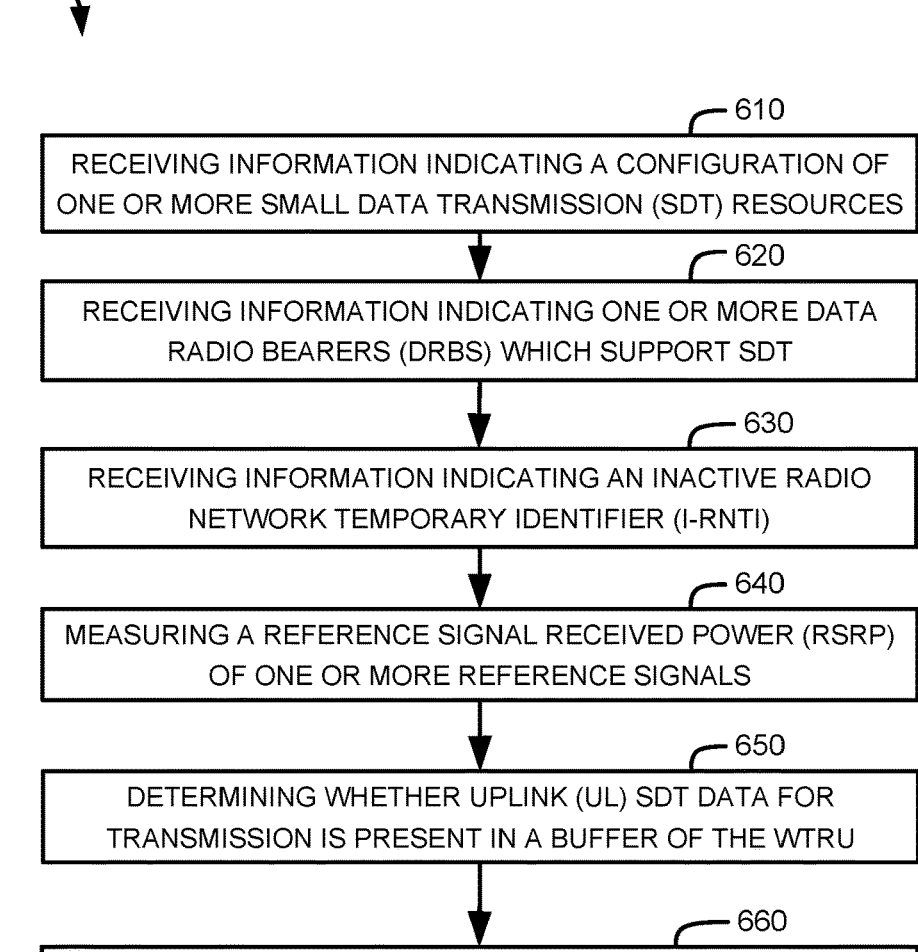

610

RECEIVING INFORMATION INDICATING A CONFIGURATION OF ONE OR MORE SMALL DATA TRANSMISSION (SDT) RESOURCES

620

RECEIVING INFORMATION INDICATING ONE OR MORE DATA RADIO BEARERS (DRBS) WHICH SUPPORT SDT

630

RECEIVING INFORMATION INDICATING AN INACTIVE RADIO NETWORK TEMPORARY IDENTIFIER (I-RNTI)

640

MEASURING A REFERENCE SIGNAL RECEIVED POWER (RSRP) OF ONE OR MORE REFERENCE SIGNALS

650

DETERMINING WHETHER UPLINK (UL) SDT DATA FOR TRANSMISSION IS PRESENT IN A BUFFER OF THE WTRU

660

ON CONDITION THAT (1) AT LEAST A PORTION OF THE UL SDT DATA PRESENT IN THE BUFFER IS FOR A DRB WHICH DOES NOT SUPPORT SDT, OR (2) THE UL SDT DATA PRESENT IN THE BUFFER IS FOR THE ONE OR MORE DRBS WHICH SUPPORT SDT AND A SIZE OF THE UL SDT DATA PRESENT IN THE BUFFER IS GREATER THAN OR EQUAL TO A FIRST THRESHOLD, OR (3) THE MEASURED RSRP IS LESS THAN A SECOND THRESHOLD:
SENDING A REQUEST TO RESUME A RADIO RESOURCE CONTROL (RRC) CONNECTION TO A RADIO ACCESS NETWORK (RAN), THE REQUEST TO RESUME THE RRC CONNECTION INCLUDING THE INFORMATION INDICATING THE I-RNTI

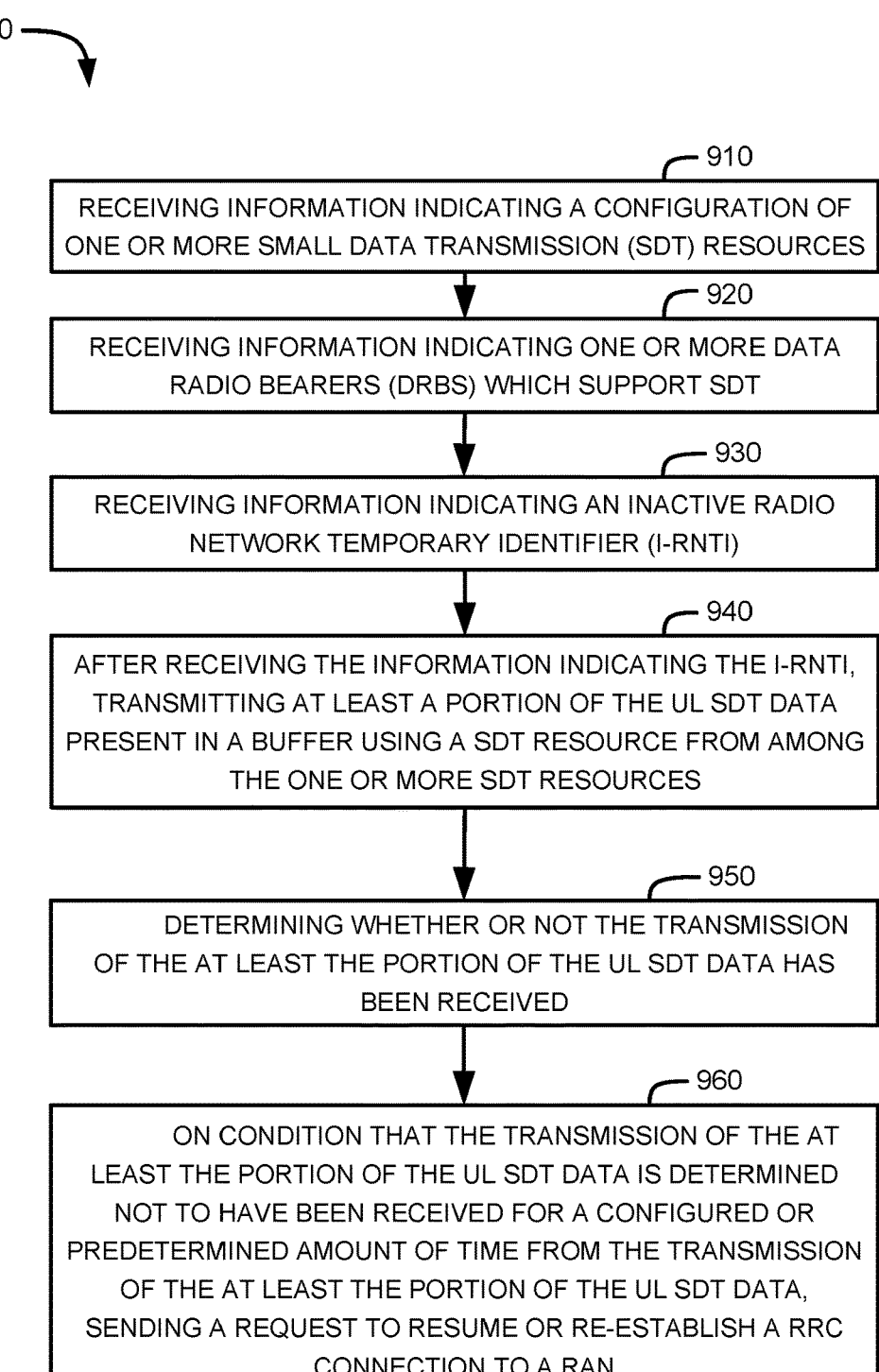

910

RECEIVING INFORMATION INDICATING A CONFIGURATION OF ONE OR MORE SMALL DATA TRANSMISSION (SDT) RESOURCES

920

RECEIVING INFORMATION INDICATING ONE OR MORE DATA RADIO BEARERS (DRBS) WHICH SUPPORT SDT

930

RECEIVING INFORMATION INDICATING AN INACTIVE RADIO NETWORK TEMPORARY IDENTIFIER (I-RNTI)

940

AFTER RECEIVING THE INFORMATION INDICATING THE I-RNTI, TRANSMITTING AT LEAST A PORTION OF THE UL SDT DATA PRESENT IN A BUFFER USING A SDT RESOURCE FROM AMONG THE ONE OR MORE SDT RESOURCES

950

DETERMINING WHETHER OR NOT THE TRANSMISSION OF THE AT LEAST THE PORTION OF THE UL SDT DATA HAS BEEN RECEIVED

960

ON CONDITION THAT THE TRANSMISSION OF THE AT LEAST THE PORTION OF THE UL SDT DATA IS DETERMINED NOT TO HAVE BEEN RECEIVED FOR A CONFIGURED OR PREDETERMINED AMOUNT OF TIME FROM THE TRANSMISSION OF THE AT LEAST THE PORTION OF THE UL SDT DATA, SENDING A REQUEST TO RESUME OR RE-ESTABLISH A RRC CONNECTION TO A RAN

FIG. 9

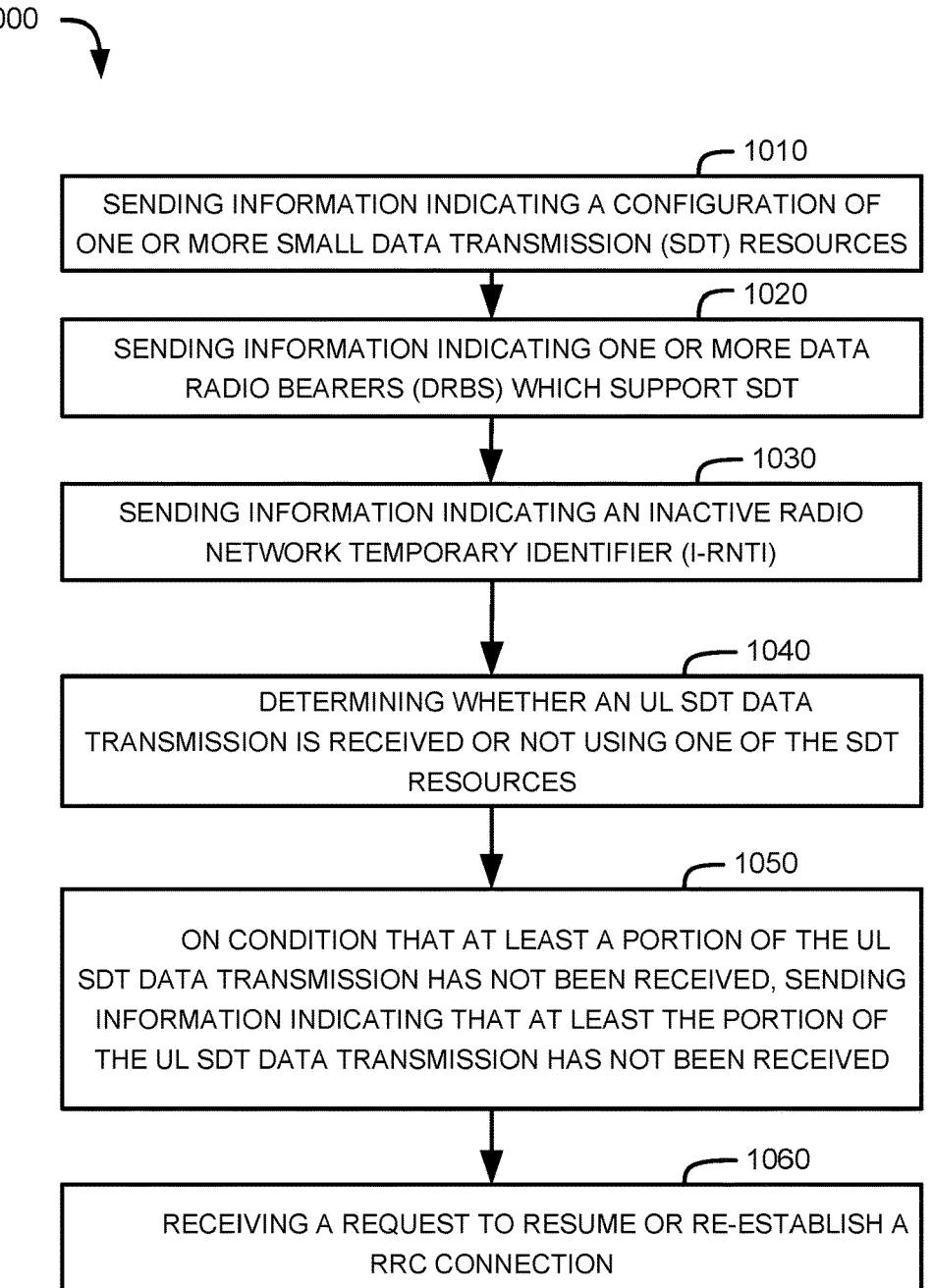

1000

1010
SENDING INFORMATION INDICATING A CONFIGURATION OF ONE OR MORE SMALL DATA TRANSMISSION (SDT) RESOURCES

1020
SENDING INFORMATION INDICATING ONE OR MORE DATA RADIO BEARERS (DRBS) WHICH SUPPORT SDT

1030
SENDING INFORMATION INDICATING AN INACTIVE RADIO NETWORK TEMPORARY IDENTIFIER (I-RNTI)

1040
DETERMINING WHETHER AN UL SDT DATA TRANSMISSION IS RECEIVED OR NOT USING ONE OF THE SDT RESOURCES

1050
ON CONDITION THAT AT LEAST A PORTION OF THE UL SDT DATA TRANSMISSION HAS NOT BEEN RECEIVED, SENDING INFORMATION INDICATING THAT AT LEAST THE PORTION OF THE UL SDT DATA TRANSMISSION HAS NOT BEEN RECEIVED

1060
RECEIVING A REQUEST TO RESUME OR RE-ESTABLISH A RRC CONNECTION

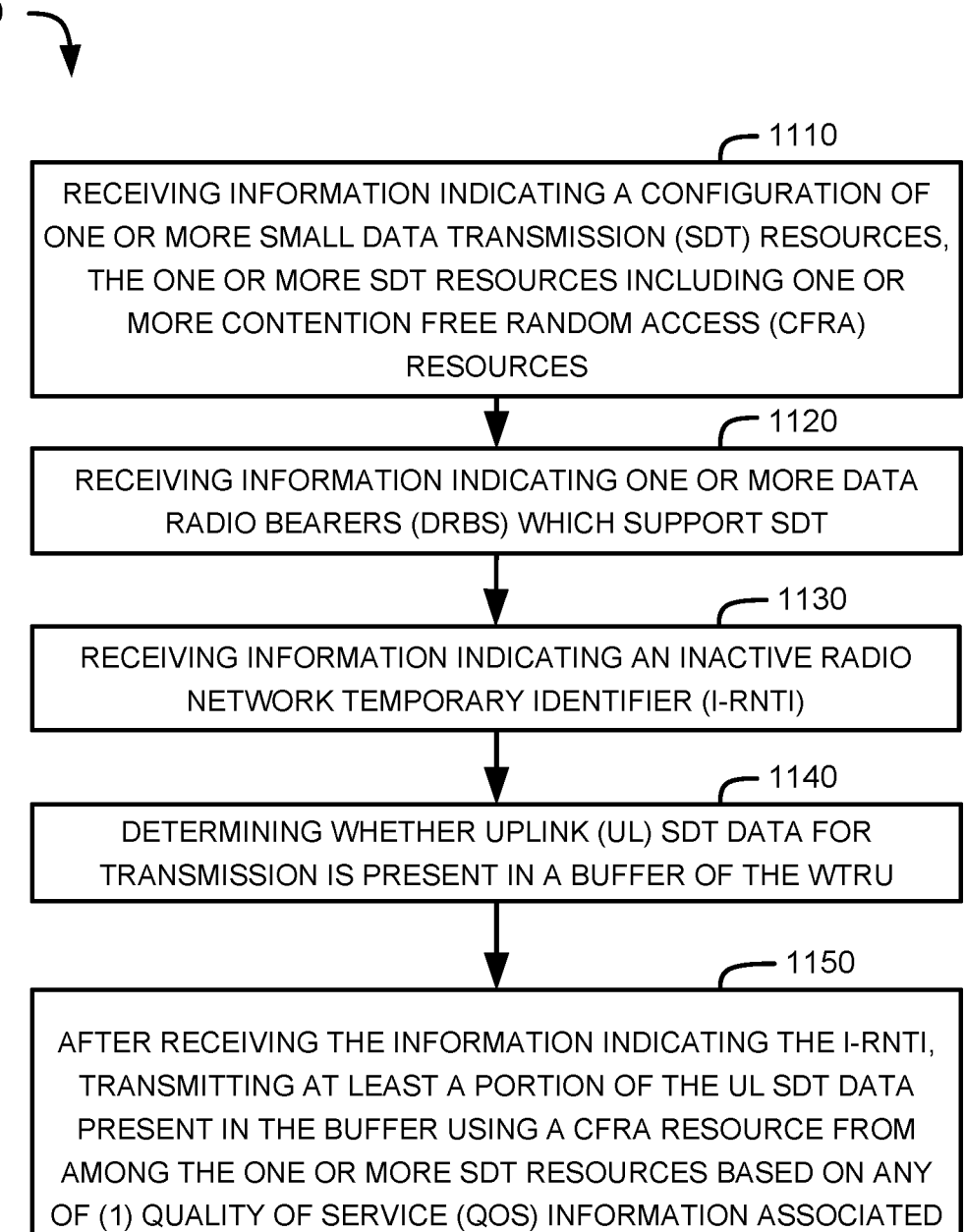

1110

RECEIVING INFORMATION INDICATING A CONFIGURATION OF ONE OR MORE SMALL DATA TRANSMISSION (SDT) RESOURCES, THE ONE OR MORE SDT RESOURCES INCLUDING ONE OR MORE CONTENTION FREE RANDOM ACCESS (CFRA) RESOURCES

1120

RECEIVING INFORMATION INDICATING ONE OR MORE DATA RADIO BEARERS (DRBS) WHICH SUPPORT SDT

1130

RECEIVING INFORMATION INDICATING AN INACTIVE RADIO NETWORK TEMPORARY IDENTIFIER (I-RNTI)

1140

DETERMINING WHETHER UPLINK (UL) SDT DATA FOR TRANSMISSION IS PRESENT IN A BUFFER OF THE WTRU

1150

AFTER RECEIVING THE INFORMATION INDICATING THE I-RNTI, TRANSMITTING AT LEAST A PORTION OF THE UL SDT DATA PRESENT IN THE BUFFER USING A CFRA RESOURCE FROM AMONG THE ONE OR MORE SDT RESOURCES BASED ON ANY OF (1) QUALITY OF SERVICE (QOS) INFORMATION ASSOCIATED WITH THE UL SDT DATA PRESENT IN THE BUFFER AND/OR (2) A MEASURED CHANNEL CONDITION

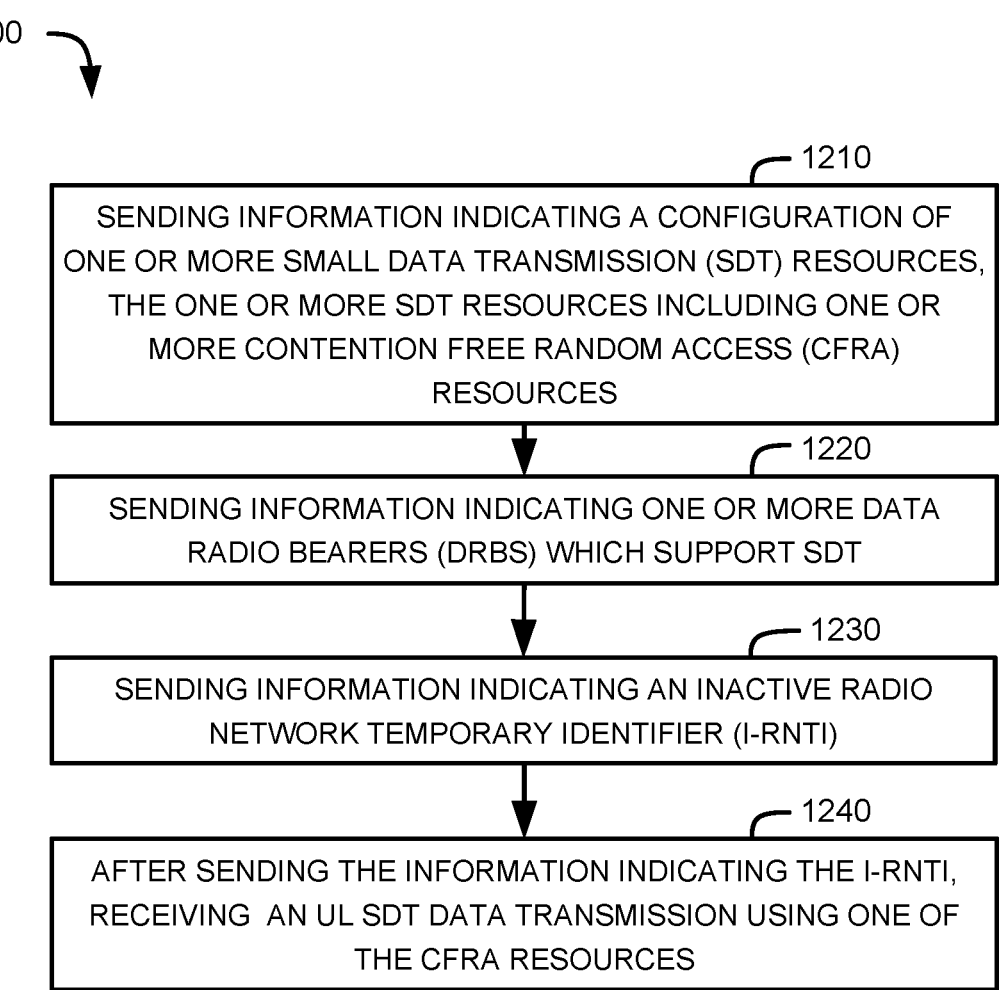

1210

SENDING INFORMATION INDICATING A CONFIGURATION OF ONE OR MORE SMALL DATA TRANSMISSION (SDT) RESOURCES, THE ONE OR MORE SDT RESOURCES INCLUDING ONE OR MORE CONTENTION FREE RANDOM ACCESS (CFRA) RESOURCES

1220

SENDING INFORMATION INDICATING ONE OR MORE DATA RADIO BEARERS (DRBS) WHICH SUPPORT SDT

1230

SENDING INFORMATION INDICATING AN INACTIVE RADIO NETWORK TEMPORARY IDENTIFIER (I-RNTI)

1240

AFTER SENDING THE INFORMATION INDICATING THE I-RNTI, RECEIVING AN UL SDT DATA TRANSMISSION USING ONE OF THE CFRA RESOURCES

FIG. 12

METHODS, APPARATUS AND SYSTEMS FOR UPLINK TRANSMISSION OF SMALL DATA

CROSS REFERENCE TO RELATED APPLICATIONS

This application is a U.S. National Stage Application under 35 U.S.C. § 371 of International Patent Application No. PCT/US2021/026119 filed Apr. 7, 2021 which claims the benefit of priority to U.S. Patent Application Ser. No. 63/007,166, filed Apr. 8, 2020, U.S. Patent Application Ser. No. 63/061,435, filed Aug. 5, 2020, and U.S. Patent Application Ser. No. 63/093,996 filed Oct. 20, 2020, the contents of each being incorporated by reference as if fully set forth herein.

FIELD

Embodiments disclosed herein generally relate to wireless communications and, for example to methods, apparatus and systems for small data transmission, for example, in the uplink direction.

RELATED ART

Mobile communications using wireless communication continue to evolve. A fifth generation may be referred to as 5G and a sixth generation may be referred to as 6G. A previous (legacy) generation of mobile communication may be, for example, fourth generation (4G) long term evolution (LTE).

SUMMARY

Methods for resource efficient data transmission are described herein. A method may comprise operating in one of an idle or an inactive mode and transmitting, in response to a random access (RA) message or a configured grant (CG), a small data transmission over an uplink channel. The RA message may be received in a two-step RA procedure or a four-step RA procedure. The method may further comprise transitioning from the idle or the inactive mode to a connected mode. The method may further comprise determining resources for transmitting the small data transmission. The method may comprise determining whether the small data transmission was successfully received and retransmitting, on a condition the small data transmission was not received, the small data transmission. The method may further comprise segmenting a small data packet into a plurality of small data packets and transmitting the small data packets in a plurality of transmission opportunities.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 10 is a system diagram illustrating an example radio access network (RAN) and an example core network (CN) that may be used within the communications system illustrated in FIG. 1A according to an embodiment;

FIG. 2 is a representative procedure that may be implemented by a WTRU to transmit a small data payload using a small data transmission (SDT) resource;

FIG. 3 is a representative procedure that may be implemented by a WTRU to transmit a small data payload using a SDT resource;

FIG. 4. is a representative procedure that may be implemented by a WTRU using a SDT resource to determine whether or not to transition to connected mode;

FIG. 5 is a representative procedure that may be implemented by a WTRU to transmit a small data payload using a SDT resource;

FIG. 6 is a representative procedure that may be implemented by a WTRU using a SDT resource to determine whether or not to transition to connected mode;

FIG. 9 is a representative procedure that may be implemented by a WTRU using a SDT resource to determine whether or not to transition to connected mode;

FIG. 10 is a representative procedure that may be implemented by a base station to transition a WTRU to connected mode;

FIG. 11 is a representative procedure that may be implemented by a WTRU to transmit a small data payload using a contention-free random access (CFRA) resource; and FIG. 12 is a representative procedure that may be implemented by a base station to receive a small data payload using a contention-free random access (CFRA) resource.

DETAILED DESCRIPTION

Figure 1A:
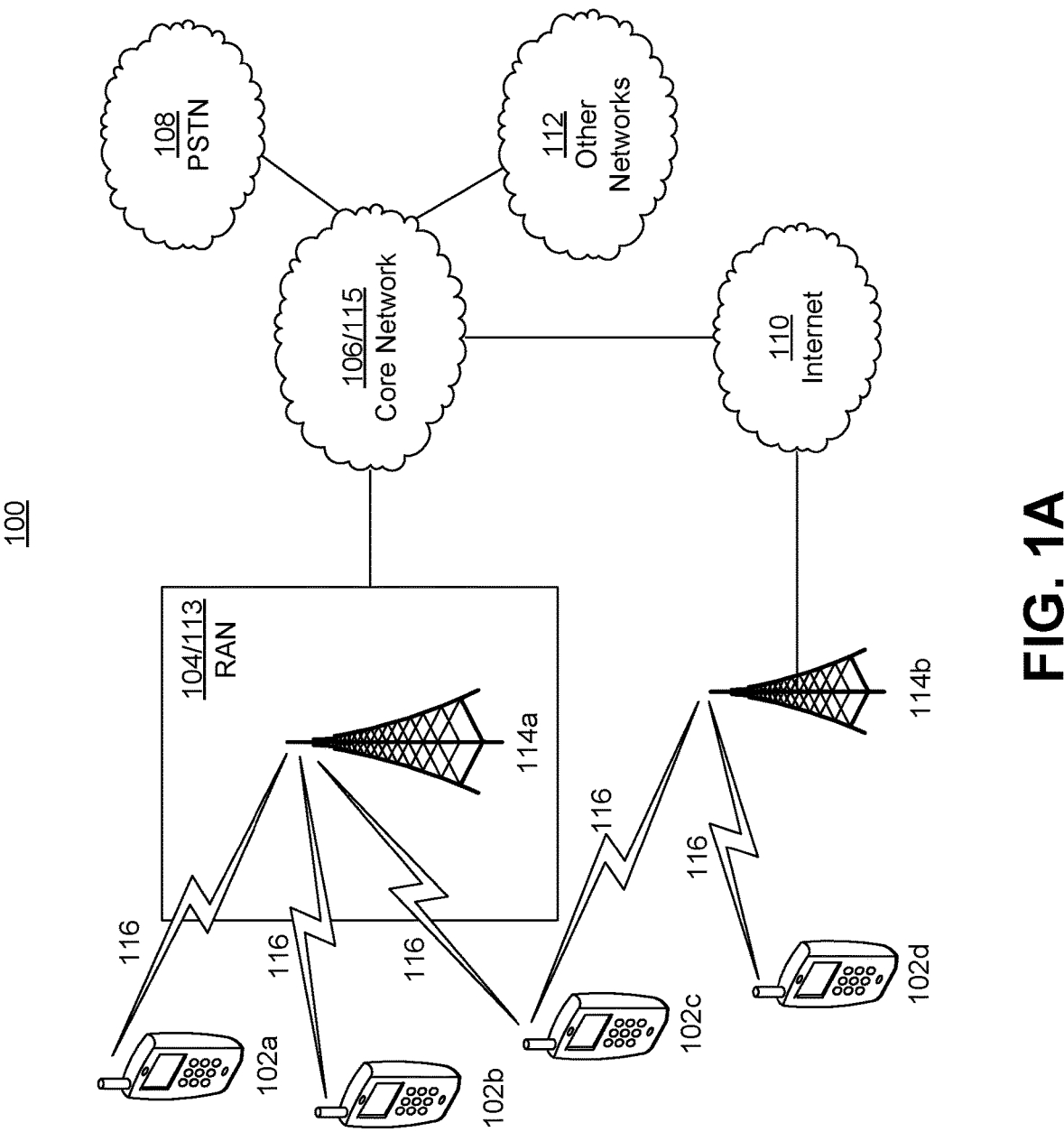
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
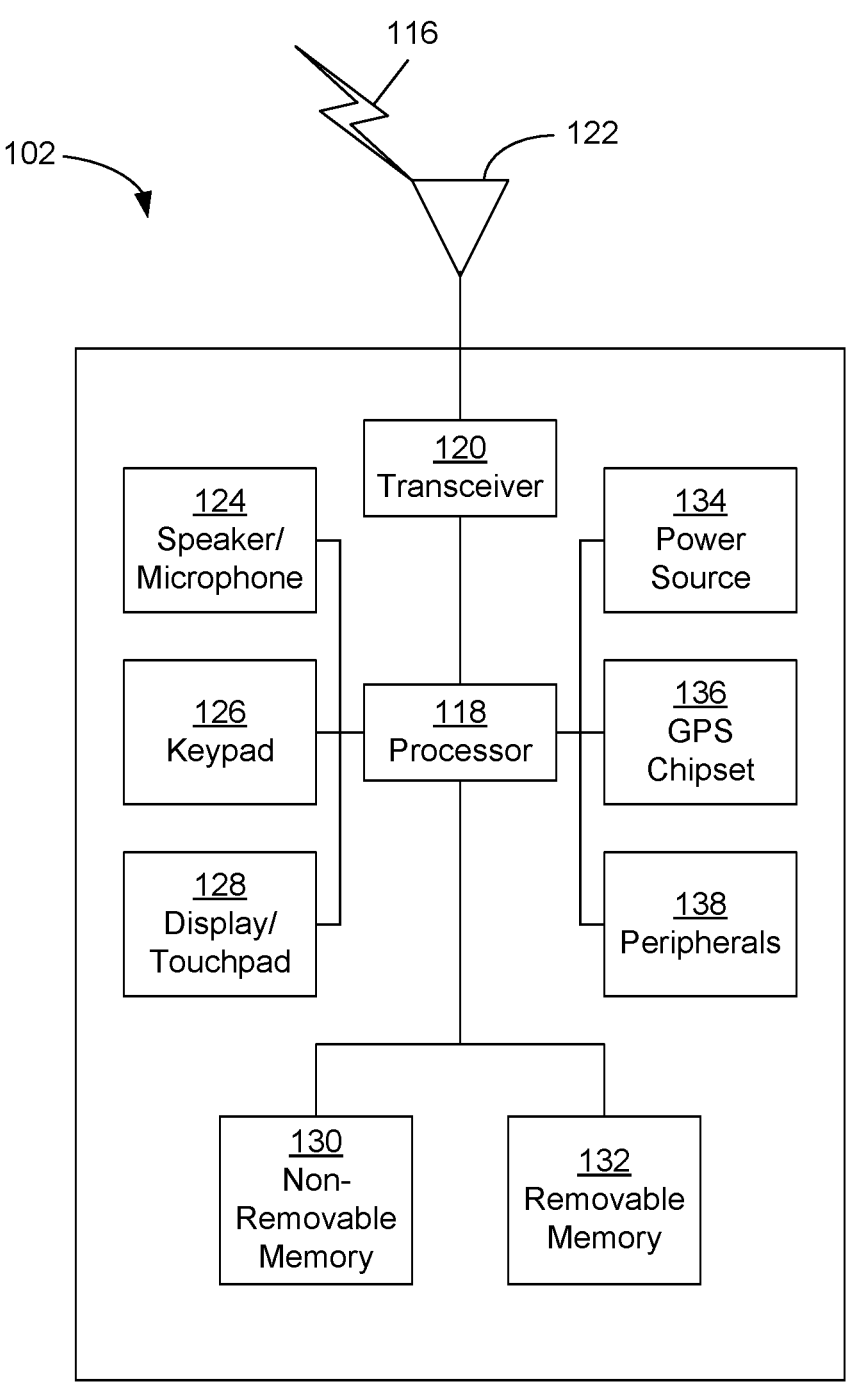
FIG. 1B is a system diagram illustrating an example wireless transmit/receive unit (WTRU) that may be used within the communications system illustrated in FIG. 1A according to an embodiment.
Figure 1C:
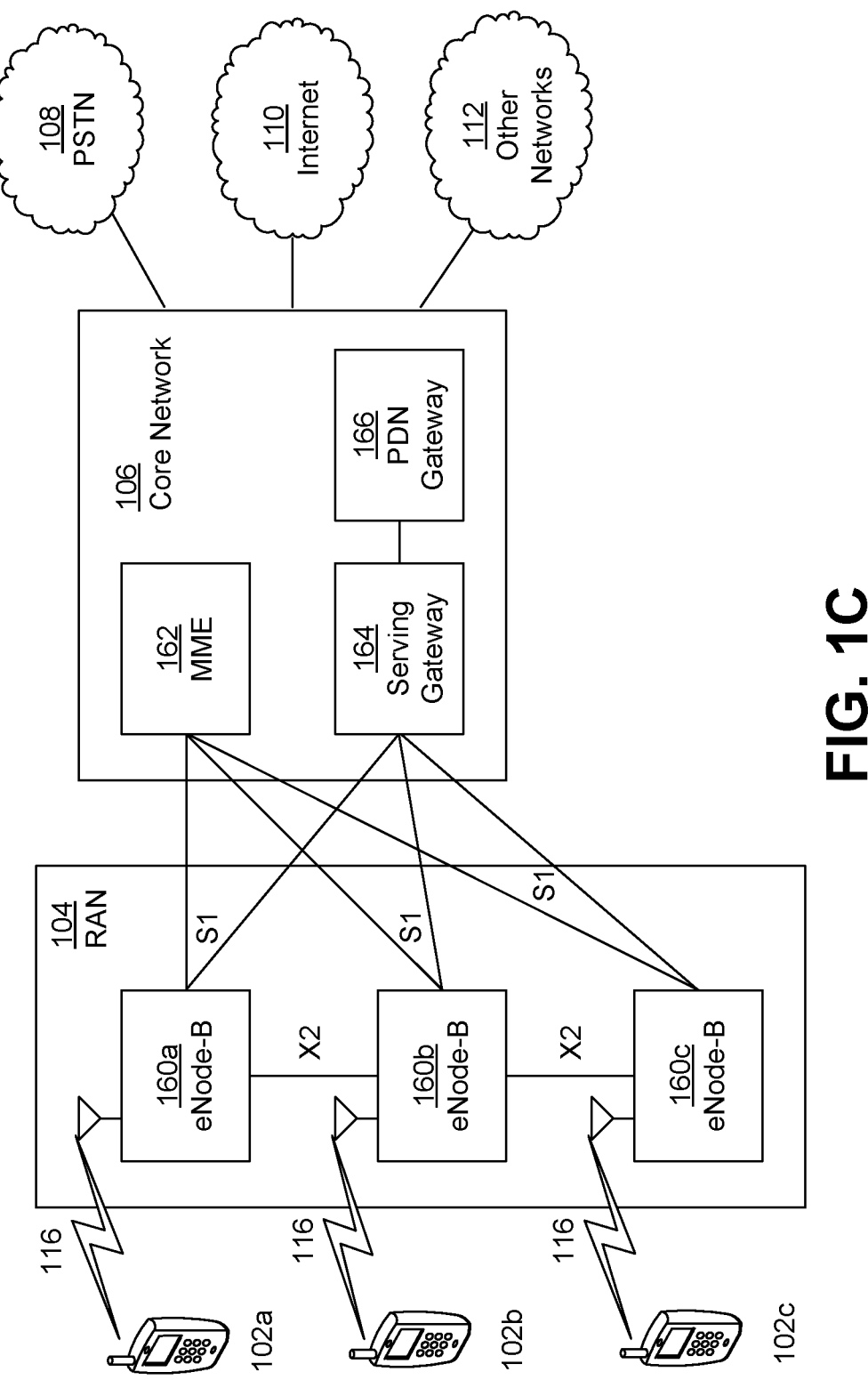
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
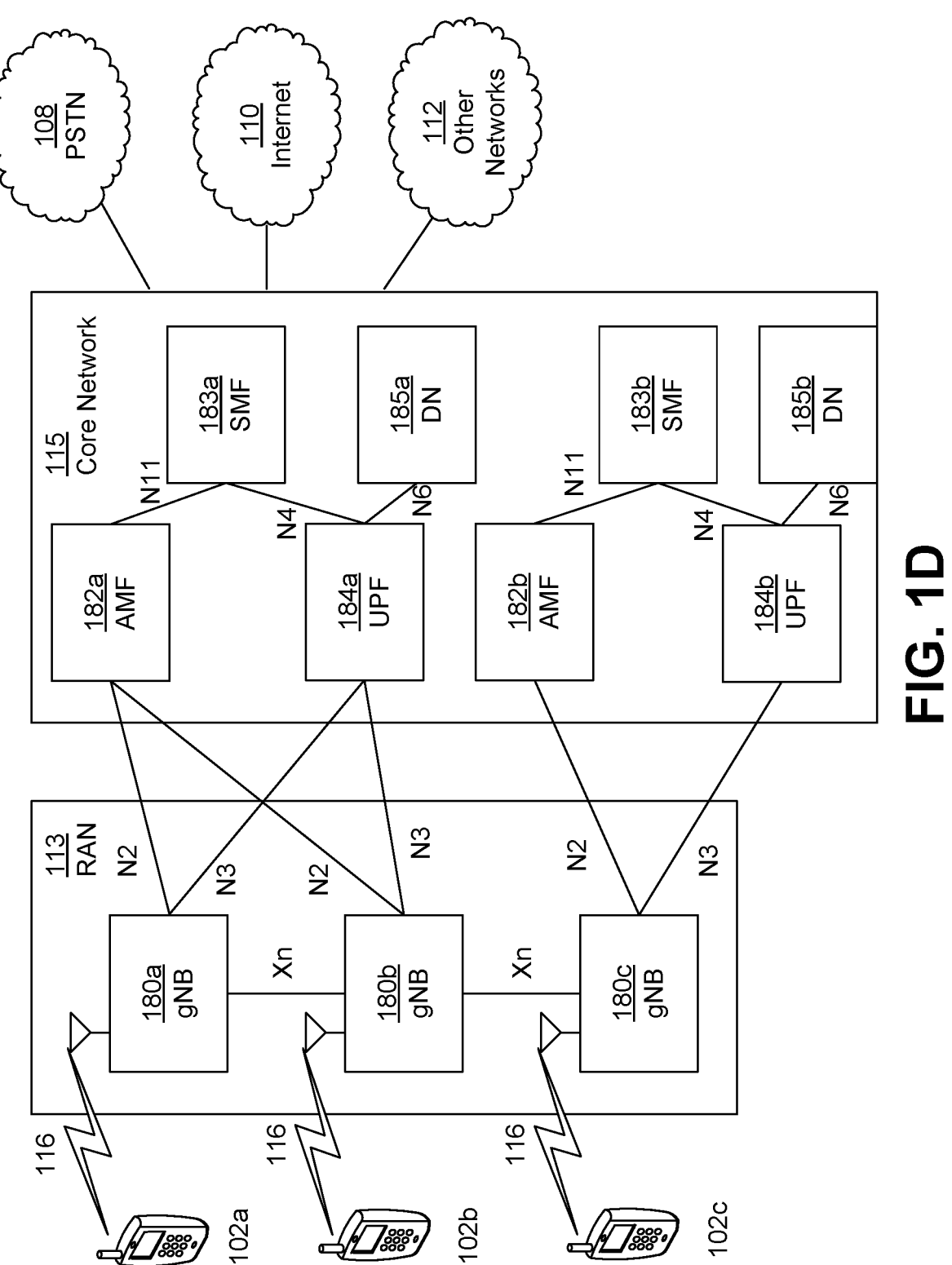

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following abbreviations may be used throughout this disclosure.

CG Configured grant or cell group
DG Dynamic grant
CAPC Channel access priority class
DFI Downlink feedback information
HARQ PID HARQ Process ID
eLAA enhanced Licensed Assisted Access
FeLAA Further enhanced Licensed Assisted Access
MAC CE MAC control element
RO RACH occasion RA random access
PRACH Physical Random-access Channel
ACK Acknowledgement
BLER Block Error Rate
BWP Bandwidth Part
CAP Channel Access Priority
CCA Clear Channel Assessment
CP Cyclic Prefix
CP-OFDM Conventional OFDM (relying on cyclic prefix)
CQI Channel Quality Indicator
CRC Cyclic Redundancy Check
CSI Channel State Information
CW Contention Window
CWS Contention Window Size
CO Channel Occupancy
DAI Downlink Assignment Index
DCI Downlink Control Information
DL Downlink
DM-RS Demodulation Reference Signal
DRB Data Radio Bearer
HARQ Hybrid Automatic Repeat Request
LAA License Assisted Access
LBT Listen-Before-Talk
LTE Long Term Evolution e.g. from 3GPP LTE R8 and up
NACK Negative ACK
MCS Modulation and Coding Scheme
MIMO Multiple Input Multiple Output
NR New Radio
OFDM Orthogonal Frequency-Division Multiplexing
PHY Physical Layer
PRACH Physical Random Access Channel
PSS Primary Synchronization Signal
RACH Random Access Channel (or procedure)
RAR Random Access Response
RCU Radio access network Central Unit
RF Radio Front end
RLF Radio Link Failure
RLM Radio Link Monitoring
RNTI Radio Network Identifier
RRC Radio Resource Control
RRM Radio Resource Management
RS Reference Signal
RSRP Reference Signal Received Power
RSSI Received Signal Strength Indicator
SDU Service Data Unit
SRS Sounding Reference Signal
SS Synchronization Signal
SSS Secondary Synchronization Signal
SWG Switching Gap (in a self-contained subframe)
SPS Semi-persistent scheduling
SUL Supplemental Uplink
TB Transport Block
TBS Transport Block Size
TRP Transmission/Reception Point
TSC Time-sensitive communications
TSN Time-sensitive networking
UL Uplink
URLLC Ultra-Reliable and Low Latency Communications
WBWP Wide Bandwidth Part
WLAN Wireless Local Area Networks and related technologies (IEEE 802.xx domain)

The following terminology may be used throughout this disclosure. "CSI" may refer to channel state information, which may include at least one of the following: a channel quality index (CQI); a rank indicator (RI); a precoding matrix index (PMI); an L1 channel measurement (e.g. a reference signal received power (RSRP) such as L1-RSRP, or signal-to-interference-plus-noise ratio (SINR); a CSI-RS resource indicator (CRI); a synchronization signal/physical broadcast channel (SS/PBCH) block resource indicator (SSBRI); a layer indicator (LI); and/or any other measurement quantity measured by the WTRU from the configured CSI-RS or SS/PBCH block.

"UCI" may refer to uplink control information, which may include: CSI; HARQ feedback for one or more HARQ processes; a scheduling request (SR); a link recovery request (LRR); a CG-UCI and/or other control information bits that may be transmitted on the physical uplink control channel (PUCCH) or physical uplink shared channel (PUSCH).

"Channel conditions" may refer to any conditions relating to the state of the radio/channel, which may be determined by the WTRU from: a WTRU measurement (e.g., L1/SINR/RSRP, CQI/MCS, channel occupancy, RSSI, power headroom, exposure headroom); L3/mobility-based measurements (e.g. RSRP, RSRQ); a radio link monitoring (RLM) state; and/or channel availability in an unlicensed spectrum (e.g. whether the channel is occupied based on determination of a listen-before-talk (LBT) procedure or whether the channel is deemed to have experienced a consistent LBT failure).

"Physical random access channel (PRACH) resource" may refer to a PRACH resource (e.g., in frequency), a PRACH occasion (RO) (e.g., in time); a preamble format (e.g., in terms of total preamble duration, sequence length, guard time duration and/or in terms of length of cyclic prefix); and/or a certain preamble sequence used for the transmission of a preamble in a random access procedure.

"Small data" may refer to uplink-shared channel (UL-SCH) data (non-control channel) transmitted by the WTRU in a non-connected mode.

"MsgA" may refer to preamble and payload transmissions on PRACH and PUSCH resources respectively in a two-step RA procedure, as defined, for example, in 3GPP Technical Specification (TS) 38.321.

"MsgB" may refer to the downlink response to MsgA, which may be a RAR indicating successful access, a fallback RAR, or a backoff indication, as defined, for example, in 3GPP TS 38.321.

A wireless transmit/receive unit (WTRU) may operate in a variety of transmission and reception modes including inactive, idle, and connected modes. When a WTRU transitions from an inactive mode into a connected mode to send a small amount of data, this may result in increased signaling overhead in the network and increased battery consumption. For devices supporting enhanced mobile broadband (eMBB) services, applications may perform frequent background small data transmissions, for example, to refresh app data or provide notifications, which may be periodic or aperiodic. Further, sensors and Internet of Things (IoT) devices may have a considerable amount of signaling and small data, for example, periodic heartbeat or stay-alive signals, surveillance updates, periodic video stream, and non-periodic video based on motion sensing. Requiring the WTRU to move to connected mode for such small data or signaling may affect power consumption considerably, especially for power or battery limited sensor/IoT devices or for eMBB mobile devices aiming to reduce battery consumption.

In two-step random access (RA) procedures and configured grants supported in Third Generation Partnership Project (3GPP) standards for New Radio (NR), uplink (UL) and downlink (DL) small data transmissions may be enabled without necessarily transitioning to connected mode. Solutions in NR Release 17 may be scoped for data transmission without WTRU-initiated state transitions for both UL and DL. For example, it may be desirable not to introduce new RRC states, and it may be advantageous that the network retain control over transmissions of small data in UL, subsequent transmissions of small data in UL and DL, and state transition decisions. Solutions in NR Release 17 may be scoped using two-step RA procedures, four-step RA procedures, and configured grant (CG) transmission in inactive mode. The WTRU context in inactive mode may include the configuration of radio bearers, logical channels and security information. The WTRU may keep all or a part of its context in inactive and/or idle mode. Some dedicated radio bearers (DRBs) may be suspended in inactive or idle mode.

A property of scheduling information (e.g., an uplink grant or a downlink assignment) may consist of at least one of the following: a frequency allocation; an aspect of time allocation, such as a duration; a priority; a modulation and coding scheme; a transport block size; a number of spatial layers; a number of transport blocks to be carried; a TCI state or SRI; a number of repetitions; or whether the grant is a configured grant type 1, type 2, or a dynamic grant.

An indication by DCI may comprise at least one of an explicit indication by a DCI field or by RNTI used to mask CRC of the PDCCH. An indication by the DCI may also be an implicit indication by a property such as: a DCI format; a DCI size; a control resources set (CORESET) or search space; an aggregation level; an identity of a first control channel resource (e.g., an index of a first control channel element (CCE)) for a DCI, where the mapping between the property and the value may be signaled by RRC or MAC.

Small uplink data transfers may raise various problems with respect to resource allocation and power. For example, a transition of the control plane connectivity state from either the idle mode or the inactive mode into connected mode to send or receive a small amount of user plane data for a dedicated radio bearer (a DRB, or a SRB) may lead to increased signaling overhead in the network and increased battery consumption for the WTRU.

It may be advantageous for a WTRU to be able to transmit variable amounts of small data in the uplink without having to transition into a different connectivity state or into a different power usage or power saving mode. In NR Release 15 and Release 16 standards, for instance, transmission of user plane data for a dedicated radio bearer (e.g., DRB, SRB) while not in the RRC connected mode is not supported. Thus, methods to support uplink data transmission in idle or inactive modes may be desirable to enable uplink transmissions of small amounts of unicast data.

In some solutions, a WTRU may perform resource selection and transmit transport blocks (TBs) of variable sizes. The WTRU may transmit small data, optionally supported by a preamble transmission during a two-step and/or four-step random access channel (RACH) procedure, for example, via one or more of the following methods described herein. In subsequent sections, such transmission of TBs may be referred to as a transmission opportunity.

In the context of a four-step RACH procedure, an UL grant may be provided in Msg2. For example, the Msg2 response message may include an UL grant for transmission of subsequent small data (e.g. while the WTRU remains in an inactive state).

In some solutions, the small data may be transmitted as part of a as a Msg3 PUSCH resource.

In some solutions, an UL grant may be provided in Msg4 of a four-step RACH procedure. For example, the Msg4 response message may include an UL grant for transmission of subsequent small data (e.g. while the WTRU remains in RRC INACTIVE state). The WTRU may possibly indicate additional information about the small data payload in Msg3 (and/or possibly msgA) e.g. transport block size, QoS characteristics such as latency and/or reliability requirements. In some embodiments an UL grant may be accompanied with an applicable HARQ process ID indicated using part of the scheduling information.

In some solutions, such as in a two-step RACH procedure, the WTRU may transmit small data as a MsgA PUSCH resource.

An UL grant may be provided in MsgB. The MsgB response message may include UL grant for transmission of subsequent small data (e.g. while the WTRU remains in an inactive state). The WTRU may possibly indicate additional information about the small data payload in MsgA (and/or possibly Msg3) such as transport block size, QoS characteristics such as latency or reliability requirements. In some embodiments, an UL grant may be accompanied with an applicable HARQ process ID indicated in part of the scheduling information.

The WTRU may select one or more transmission opportunities for small data transmission via selection of a linked resource. For example, the WTRU may select one or more RACH preambles and/or RACH occasions associated with a small data transmission opportunity or opportunities. The RACH preambles and or RACH occasions may be shared between small data transmission and legacy random access, exclusively used for legacy random access, or exclusively used for small data transmission. The preamble and or RACH occasion selection may also be subject to restrictions and/or small data characteristics (e.g. a validity criteria described in subsequent sections).

Resource selection-to-transmission opportunity links may be configured dynamically or semi-statically. The WTRU may obtain the association of resources with small data transmission opportunities in, for instance, one or more of the following methods. In some cases, the WTRU may obtain the association via dedicated signaling, such as via RRC or MAC control elements. In some cases, the WTRU may obtain the association through broadcast signaling, such as via system information.

In some solutions, a WTRU may select and optionally validate a resource for a small data transmission. For example, the WTRU may select a resource linked with a first available small data transmission opportunity. In another possible solution, the WTRU may only select resources linked to a transmission opportunity that satisfy one or more criteria. For instance, a transmission opportunity and linked resource may be subject to one or more conditions.

As one condition, a WTRU may or may not select a specific transmission opportunity or linked resource based on one or more WTRU capabilities. For example, the WTRU may not be capable of performing a two-step RACH, and thus small data transmissions to be performed in transmission opportunities associated with MsgA and/or MsgB may not be allowed. In another example, the WTRU may only be capable of supporting small data transmission within a certain bit size. In another example, the WTRU may be subject to minimum processing requirements.

As another condition, a WTRU may or may not select a specific transmission opportunity or linked resource based on the characteristics of the data packet intended for that transmission opportunity. For example, the transmission opportunity may only support a maximum small data packet size and/or range of allowable packet sizes. In some cases, the small data may be subject to QoS requirements such as, for example, latency and reliability requirements. In some cases, the condition may be based on the type of data (e.g. MAC CE, small data) and associated priority. For instance, the WTRU may select a given resource only if it meets the QoS requirements associated with the buffered small data. In another example, a WTRU may be configured with the type of MAC CEs that can be included in resources applicable for small data transfer.

As another condition, a WTRU may or may not select a specific transmission opportunity or linked resource based on the channel conditions. For example, a WTRU may not select a specific resource if the channel conditions (e.g. RSRP/RSRQ/SINR) fall below a specific or configured (e.g., preconfigured) threshold.

As another condition, a WTRU may or may not select a specific transmission opportunity or linked resource based on the WTRU's synchronization status with the network. For example, the WTRU may need to maintain a timing synchronization requirement in order to transmit on a transmission opportunity.

As another condition, a WTRU may or may not select a specific transmission opportunity or linked resource based on the mobility status of the WTRU. For example, a WTRU may transmit in a small data transmission opportunity if it is stationary or in a low mobility status. In another example, the WTRU may select a subset of PRACH and/or PUSCH resources in the target cell for small data transfer during handover.

As another condition, a WTRU may or may not select a specific transmission opportunity/linked resource based on the position of the WTRU within the cell. The position may be determined, for example, based on one or more of an RSRP/RSRQ, GPS methods, or network-based position methods. For example, the WTRU may be allowed to transmit on a small data opportunity or select a linked resource if it is, for instance, within the cell center, at some position relative to a cell edge, or at a specific distance range.

As another condition, a WTRU may or may not select a specific transmission opportunity or linked resource based on the Random Access type. The type may be, for example, RA for mobility, BFR, or initial access. As another condition, a WTRU may or may not select a specific transmission opportunity/linked resource based on whether a packet is segment of a larger packet or whether the packet comprises a single small data packet.

In some solutions, the WTRU MAC may perform a single RA procedure at a time. The WTRU may have more than one RA procedure triggered for different RA types or triggers, such as small data transfer, mobility, beam failure recovery, or system information acquisition. In case multiple RA procedures are triggered, the WTRU may initiate a single RA procedure for one of the RA triggers/types, or the WTRU may initiate a combined RA procedure for all RA types. The WTRU may be configured or predefined to prioritize one or several of the triggered RA types. In one example, the WTRU may prioritize RA procedures for legacy types over RA procedures for small data transfers. The WTRU may prioritize RA procedures involving connectivity management over RA for small data transfer, such as RA procedures triggered by mobility, BFR, or system information acquisition. In another example, the WTRU may prioritize an RA triggered by a small data transfer if data from a specific (e.g. configured) LCH or DRB is buffered and can be transmitted over the RA procedure. In one method, the WTRU may combine triggered RA types into a single RA procedure. For example, the WTRU may transmit, in the UL direction, a small data part of an RA initiated by mobility or BFR. The WTRU may opportunistically include a small data part of such RA procedure after prioritizing CCCH data and control information (e.g. BFR MAC CE, system info request). In some methods, the WTRU may defer small data transmission to a connected mode if another RA procedure is triggered and may result in the WTRU transitioning into connected mode.

Solutions involving segmentation of service data units (SDUs) and transmitting such segments in subsequent transmissions are described herein. If a small data packet is too large for a selected (or any) transmission method or methods, or if the amount of buffered small data applicable for transmission on a given resource is higher than the supported/configured transport block size (TBS) of a PUSCH resource, the WTRU may segment an SDU and transmit the segments over multiple small data transmission opportunities. For example, an upper later IP packet may have multiple SDUs, and an earlier SDU may possibly indicate that a subsequent SDU is part of a same IP packet.

In some solutions, a WTRU may indicate to a NodeB (e.g., an eNodeB or gNB) that a small data packet is part of a segmented packet. The WTRU may also indicate the need for a subsequent grant to transmit small data or to indicate the amount of remaining small data buffered. possibly via one or a combination of several methods. In some methods, a WTRU may transmit, for instance, in MsgA or Msg3, a BSR indicating to the network the amount of small data to be transmitted.

In some methods, a WTRU may indicate in a small data transmission opportunity that a small data packet is part of a segment. The WTRU may also indicate how many remaining packets are required to be transmitted. The indication may be carried in part of a MAC CE or in a protocol data unit (PDU) itself. The WTRU may further transmit a resource request indication (e.g. a scheduling request (SR) embedded as UCI on a PUSCH or an SR transmitted on a PUCCH) to indicate need for additional UL-SCH resources for one or more logical channels (LCHs). The WTRU may be configured with one or more SR configurations to request additional resources for small data transmission. For example, the WTRU may embed the SR as UCI on PUSCH on a first TB to request a subsequent resource.

In some methods, a WTRU may indicate to the network that the data packet is segmented, or the WTRU may indicate the need for a subsequent grant to transmit (further) small data, via an RRC message. For example, such indication(s) may be included in any of a RRC connection resume, a RRC connection establishment, or a RRC connection re-establishment message.

In some methods, a WTRU may indicate to the network that the data packet is segmented, or the WTRU may indicate the need for a subsequent grant to transmit (further) small data, via transmission in an opportunity or a resource configured or reserved to indicate the need for further resources. For example, the WTRU may implicitly provide the indication for the need of subsequent resources by transmitting a PDU configured to provide such indication.

Upon transmission of the indication for subsequent resources for further small data transfer, a WTRU may be configured to monitor one or more PDCCHs on a certain resource (e.g. a CORESET, search space, or aggregation level), possibly for a configured timeframe after providing the indication, for the reception of a grant and/or PUSCH resource activation DCI. In some methods, the WTRU may monitor a PDCCH for subsequent scheduling during the next 'on' duration configured for paging discontinuous reception (DRX), which may be after a small data transmission or reception and/or after providing an indication for one or more subsequent data transmissions. A WTRU may monitor a specific coreset, search space, or RNTI for the reception of subsequent scheduling. For example, the WTRU may monitor a C-RNTI or I-RNTI for reception of subsequent scheduling. In another method, the WTRU may be configured with preamble partitions or groups to indicate the amount of buffered small data or the amount of subsequent small data or the amount of buffered small data TBS. For example, the WTRU may select a given preamble group if the amount of buffered small data or the amount of subsequent small data (data that would not fit in MsgA or Msg3 in the ongoing RA procedure) is above a configured threshold or within a configured range.

Various embodiments describing WTRU behavior when a small data SDU is bigger than a selected grant size are provided herein. In some cases, a WTRU may perform additional transmissions, e.g. if it has indicated that a small data packet is a segment, or that there are multiple small data packets to transmit. For example, in some cases, a WTRU may receive a response (e.g. in MsgB, Msg2, Msg4) type in a RA procedure, which may include UL grant for transmission of subsequent data (e.g. in INACTIVE state).

In some cases, a WTRU may change the small data transmission method (e.g. different RA resource, switch between two-step and four-step RACH procedures, or use a CG). This may depend on the data TBS or whether a nodeB response has not been received, possibly due to timer expiry, or it may depend on whether there is subsequent data for transmission. For example, the WTRU may send data using a two-step RA procedure and then send subsequent data using CG. The reverse circumstances may occur as well. In another example, small data may be sent using MsgA, and subsequent data may be sent in an UL grant provided by a fallback RAR.

In some cases where a small data SDU is bigger than a selected grant size, a WTRU may transition to a different state when receiving an indication from the network, Embodiments directed to transitioning between states or modes are described herein. In some cases, a WTRU may be configured for transmission or reception of small data in a state other than connected state, such as an inactive or idle state. The WTRU may determine to initiate a procedure for transitioning to a connected state, such as when performing RRC connection establishment or RRC connection resume procedures based on at least one trigger.

The trigger may be based on at least one of several aspects. For instance, the trigger may be based on the resources configured for transmission or reception of small data, such as configured grants, a two-step RACH configuration, or SPS configuration. For example, there may be At least one payload or transport block size for MsgA, and a payload or transport block size may be provided for at least configured grant or SPS configurations.

The trigger may be based on a radio bearer and/or LCH configuration. Data for the configuration may be available for transmission, or data may be received, and the data may include, for example, an RLC mode of operation.

The data for the configuration may include at least one parameter for the LCH configuration such as an LCH priority, a prioritized bit rate, a bucket size duration, an allowed serving cell, a subcarrier spacing, a maximum PUSCH duration, and whether the LCH is allowed to be included in a configured grant.

The data for the configuration may be a function of QoS. In some cases, the WTRU may transition to connected mode if it has buffered small data to transmit, but does not have a suitable grant for transmission or does not meet the required QoS requirements configured for the associated bearers. In one example, the WTRU may transition to connected mode if it has buffered small data for LCHs configured with LCP restrictions not met by available grants and/or small data transmission methods.

The data for the configuration may include whether logical channel group (LCG) group is configured for the LCH, or the value of the LCG group. The data may also include an SR resource configuration. In another example, downlink data for AM related to the radio bearer or LCH configuration may be received.

In some cases, a trigger may be based on at least one property of data available for transmissions over at least one LCH. Such property or properties may include an amount and/or volume of data or PDU or SDU sizes (e.g. maximum or minimum thereof), a data priority (based, for example, on the priority of a highest priority LCH), or QoS requirements associated with the DRB or DRBs. In some cases, a trigger for initiating the transition may be based on an amount of data already transmitted or received for at least one LCH; received or determined measurement results; a received or determined power headroom; or an access class priority or access identity identified by upper layers (e.g., Layer 2 and/or Layer 3). For example, a WTRU may transition into connected mode, or indicate a request to do so (e.g., RRC resume request, RRC connection establishment or RRC re-establishment request), upon condition that the small data PDU, or SDU, is going to be segmented and/or upon condition the amount, or volume, of small data buffered is above a certain or configured (e.g., preconfigured) threshold.

In determining to initiate a transition to a connected state, a WTRU may use at least one of several triggers (e.g., to transition into connected mode). For example, one triggering event may occur when data available for transmission for a LCH is higher than a configured threshold, or when a regular BSR for a LCH would be triggered. Whether this applies to an LCH, and the value of the threshold, may be configured depending on a LCH identity or LCG identity, or a LCH priority. For example, a threshold may be zero (0) for any priority higher than a configured priority.

Whether the threshold based trigger applies to an LCH may be configured depending on whether the LCH is allowed to use a configured grant for small data transmission. Whether the trigger applies to an LCH may be configured depending on the RLC mode (e.g. AM, TM, UM) for the corresponding radio bearer. For example, the threshold may be zero (0) if the RLC mode is AM.

Another triggering event may occur when a scheduling request (SR) is or would be triggered given resources configured for small data transmission. In some cases, this may only apply for certain SR identities configured by higher layers, or only if a priority of corresponding SR resource is above a priority level.

Another triggering event may occur when transmission of a single MAC SDU would not be possible using at least one resource configured for small data transmission. For example, this may occur in the case a RLC PDU cannot be segmented and is too large to be included in a transport block, considering the largest available transport block size for MsgA and/or configured grants (such may be dependent on a pathloss measurement). In another example, this may occur in the case the LCH is restricted from using a configured grant for small data transmission.

Another triggering event may occur when a metric for the amount of data transferred becomes higher than a configured threshold. The metric may correspond to a sum of PDU or SDU payloads at PDCP, RLC or MAC sublayers for a set of logical channels. The set of logical channels may be configured. The metric may be reset to zero (0) upon expiry of a timer of a configured duration. The timer may be reset, for example, every time a MAC, RLC or PDCP PDU is delivered to a lower layer (for uplink) or to a higher layer (for downlink). The metric may be maintained separately between downlink and uplink.

Another triggering event may occur upon data reception meeting at least one of several conditions. One condition may be satisfied when a transport block size is above a configured threshold (e.g. successful reception for a DL SPS configuration with corresponding transport block size above threshold). Another condition may be satisfied upon reception of a DL SPS assignment corresponding to one of a set of DL SPS configurations. Whether the trigger applies to a specific DL SPS configuration may be configured. Another condition may be satisfied when data is received for an LCH, or an amount of data received for at least one LCH is above a configured threshold. Whether this applies to a LCH, and the value of the threshold, may be configured depending on the LCH identity or a property or parameter of an associated LCH (i.e. for uplink), such as a paired LCH for RLC AM. The property may be at least one already described for the triggering based on data available for transmission.

Another triggering event may occur when one or a combination of measurement events is triggered. For example, such measurement event may be that a measurement quantity (e.g. RSRP) for a serving cell becomes lower than a configured threshold. Other triggering events may occur when a power headroom report is triggered or when a power headroom falls below a configured threshold. Another trigger may be based on an access class priority or access identity identified or configured by upper layers.

In some embodiments, a WTRU may indicate the need or desire to transition to a connected mode (e.g., perform an RRC connection resume, etc.) if any of the above triggers are satisfied.

In some embodiments, a WTRU may compute the amount, or volume, of small data which is buffered based on (e.g., as a function of) any of: the DRBs configured for small data transfer, LCHs configured for small data transfer, and/or a predetermined or configured (e.g., preconfigured) period. For example, a WTRU may compute the amount, or volume, of small data which is buffered as the (e.g., total) number of bits stored for any (e.g., all) LCHs and/or DRBs applicable (e.g. configured for) small data transmission after constructing the PDU for transmission on any given (e.g., each) TTI. The WTRU may include buffered data available for transmission in any of the RLC layer, the PDCP layer, and/or the RRC layer.

In some embodiments, a WTRU may compute the volume, or amount, after filling a grant with data, where the grant may or may not also carry the data volume/amount report. For example, the data volume or amount can be computed as an amount (e.g., total) of data available across all logical channels configured for small data, and may also include data not yet associated with a logical channel, after any (e.g., all) MAC PDUs for the TTI and/or grant have been built. For example, a WTRU may be configured (e.g., preconfigured) with a data volume threshold to transition into connected mode, or request to transition into connected mode, upon condition that an amount or volume of buffered small data is above the threshold. A WTRU may compute the amount of buffered small data before constructing a small data PDU on a given resource, such as a PUSCH resource (e.g., PUSCH resource on which the indication to transition to connected mode and/or subsequent data is multiplexed). The WTRU may then include the indication to transition to connected mode and/or subsequent data such as upon condition the amount and/or volume of small data is above the threshold (e.g., prior to running the LCP procedure).

In another example, a WTRU may compute the amount of buffered small data after constructing a small data PDU on a given resource, such as a PUSCH resource (e.g., PUSCH resource on which the indication to transition to connected mode and/or subsequent data is multiplexed). The WTRU may then include the indication to transition to connected mode and/or subsequent data such as upon condition the amount and/or volume of small data is above the threshold (e.g., prior to running the LCP procedure).

In some embodiments, a WTRU may include (e.g., only include) data that has arrived at least a certain predetermined or configured (e.g., preconfigured) period prior to computing the volume or amount of buffered small data or prior to the small data transmission start. For example, a WTRU may include (e.g., only include) data that has been buffered (e.g., is in the buffer) for at least a certain predetermined or configured period (e.g., for the data volume computation). In another example, the UE may compute the volume or amount of small data as a differential data volume as the data volume difference as compared to a previously reported (e.g., last reported) value.

In some embodiments, a WTRU may include a data volume report, such as along with the indication to transition to connected mode (or request thereof) and/or the indication for a subsequent small data transfer. The data volume report can be included as any of a MAC CE (or part thereof), indicated in a MAC subheader, and/or indicated as part of an RRC message. The data volume report may also be included as part of a BSR MAC CE or constructed as a separate MAC CE. It should be understood that the data volume may be computed per any of the foregoing examples or using any combination thereof.

Embodiments directed to load control, contention resolution, and backoff may be described herein. A WTRU may be in various contention scenarios during small data transmission. The collision scenarios described below may be possible alone or in combination.

In some scenarios, a WTRU supporting small data transmission and transmitting small data part of a RA procedure may cause a collision with another WTRU supporting small data, for instance, by selecting the same resources configured for uplink small data transmission.

In one case, there may be a collision between PRACH and PUSCH resources. The colliding WTRU may be transmitting small data on the same PRACH resource. The PRACH resource may be a two-step or a four-step RA resource.

In another case, a PRACH-only collision may occur. A colliding WTRU may not be transmitting small data on the PRACH resource (e.g. the WTRU may be performing a legacy RA procedure on the same PRACH resource). The PRACH resource may be a two-step or a four-step RA resource. The colliding WTRU may be transmitting small data and have selected a different PUSCH resource mapped to the same RO.

In another case, a PUSCH-only collision may occur: The colliding WTRU may be transmitting small data on the same PUSCH payload resource of two-step RA resources. In one example, the PUSCH resource may be contention-based while the PRACH resource may be contention free; in such case, WTRUs may collide on the PUSCH payload resources but not the PRACH resource. In another example, the PRACH resource may be associated with one or multiple PUSCH resources, were both PRACH and PUSCH resources are contention-based.

In some scenarios, a WTRU supporting small data transmission and transmitting data on a two-step RA resource may collide with a legacy WTRU not supporting small data transmission. In one case, the colliding legacy WTRU may be performing a legacy four-step RA procedure on the same PRACH resource, given that in NR Release 16, RACH occasions may be shared between two-step and four-step RA procedures. In another case, the colliding legacy WTRU may be performing a legacy two-step RA procedure on the same PRACH and/or associated PUSCH resource.

In some scenarios, a WTRU supporting small data transmission and transmitting data on a four-step RA resource may collide with a legacy WTRU not supporting small data transmission. The colliding legacy WTRU may be performing a legacy four-step RA procedure on the same PRACH resource, given that in NR Release 16 RACH occasions may be shared between two-step and four-step RA procedures.

Embodiments directed to collision determination and avoidance and contention resolution are described herein. In some solutions, after transmission of the Msg1 or MsgA parts of a RA procedure with or for small data transmissions, the WTRU may monitor for MsgB or Msg2 transmissions on a certain configured CORESET, search space, or PDCCH resources, or the WTRU may monitor for an RNTI unique to the WTRU (e.g. I-RNTI or C-RNTI), and/or a separate/ small data-RA-RNTI. Such configuration may be delivered to the WTRU by RRC or broadcast signalling.

The WTRU may start the RAR or MsgB monitoring window after the transmission of Msg1 or MsgA, during which the WTRU may monitor the PDCCH for reception of Msg2 or MsgB. An enhanced Msg2 or MsgB may provide at least one indicator upon reception of which the WTRU may determine that a collision has occurred. Such indicator or indicators may be a RAR, possibly containing an uplink grant to retransmit a MsgA payload (e.g. a fallback RAR) or to (re)-transmit small data (e.g. with a different RV); a backoff indication; or a contention resolution ID. A contention resolution ID may indicate to differentiate or identify one or more of the colliding WTRUs or the WTRU type. This may be indicated by a certain RNTI associated with the WTRU (e.g. I-RNTI or C-RNTI), or the PRACH resource may be used to schedule the RAR (e.g. the RAPID, RA-RNTI or msgB-RNTI). For example, the WTRU may determine that a T-CRNTI is applicable if it receives an indication in an enhanced RAR format.

The indicator or indicators introduced above may also be an RA-type identification (e.g. RA by a small data WTRU vs. RA by legacy WTRU). A WTRU may determine that the such indication is for itself if an explicit bit in the MAC RAR payload is flagged (e.g. to differentiate from WTRUs performing legacy two-step RA procedures), if a certain RNTI associated with the WTRU or the PRACH resource is used to schedule the RAR, if an explicit indication is signalled by DCI, or if an implicit indication is conveyed from the used PDCCH resource (e.g. CORESET or search space). The indicator introduced above may also be a timing advance command.

In some solutions, a WTRU may also determine that a Msg1/MsgB transmission was unsuccessful (e.g. a collision occurred) if it does not receive a RAR or MsgB by the expiry of the RAR/msgB window, or if it does not receive an indication that matches the WTRU's identity, the identity of the selected PRACH resource, and/or the RA type that was initiated. The WTRU may monitor for both MsgB and RAR during the RAR monitoring window, e.g. when the RACH occasion (RO) is shared between two-step and four-step RACH procedures. When the RO is shared between two-step and four-step RA procedures, the WTRU may determine that a MsgA transmission was unsuccessful—including the transmission of the small data payload—if the RAR monitoring window has expired and the WTRU has not received a success RAR in MsgB addressed to the WTRU identity, the WTRU's PRACH resource, and/or the WTRU RA type. The WTRU may receive a MsgB with a success RAR—or a number of RARs indicating success that are multiplexed—which does not contain the WTRU identity. In some cases, if the RACH resource is shared between WTRU supporting small data and legacy WTRUs, the WTRU may consider the RAR reception successful if the RA type identification was signalled or indicated part of the RAR payload or the PDCCH that scheduled the RAR.

After a WTRU determines that a collision has occurred, that the data payload was not received successfully, or when the WTRU has not received a RAR or msgB, and/or counted a number of failed data transmission attempts, the WTRU may perform one or more procedures. In some cases, the WTRU may retransmit MsgA—after backoff, if indicated—if it determines that a collision has occurred, no RAR was received (e.g. success RAR or fallback RAR) by the expiry of the msgB window, and/or the UL grant—if provided in MsgB—is not for the WTRU. The WTRU may determine whether the grant is for itself per the aforementioned identification conditions.

In some cases, the WTRU may transmit Msg3 (i.e. fallback to a four-step RA procedure), which may include the MsgA payload, if for example a grant was included and a WTRU identification matching the WTRU ID, WTRU type, and/or PRACH resource was included or indicated in the RAR.

In some cases, a WTRU may retransmit Msg1 (preamble only)—after backoff if indicated—after falling back to a four-step RA indication, after not receiving a RAR or contention resolution in a four-step RA procedure, and/or after a number of unsuccessful attempts for transmitting data payload part of two-step RA procedure.

In some cases, a WTRU may retransmit the PUSCH payload without the preamble. For example, the WTRU may receive an indication in RAR/MsgB indicating that the payload was not successfully decoded/received (e.g. NACK). The WTRU may alternatively make this determination by receiving a RAR that does not match the WTRU's identity, though it may match the identity of the PRACH resources used (e.g. an RA/MsgB-RNTI). The RAR or MsgB may be addressed to the WTRU identity or an identity associated with the selected PRACH resource. Upon reception of indication with the WTRU identity, the WTRU may retransmit the payload on the PUSCH resource associated with the previously selected PRACH (without preamble retransmission), retransmit the payload on a different PUSCH associated with the same PRACH resource, or retransmit the payload on an uplink grant provided in RAR or MsgB, if provided.

In some cases, a WTRU may retransmit the small data or the MsgA payload using a different small data transmission method (e.g. using a four-step RA procedure—or a two-step procedure if four-step was used— or using a configured grant). The WTRU may further perform this, for example, after N unsuccessful attempts or after a certain timer has elapsed. The WTRU may further perform this after receiving an indication to do so (e.g., an indication to fallback to a four-step RA procedure, fallback to transmission on CG, or fallback to transmission on a different two-step RA resource) in part of the msgB transmission. The WTRU may stop the ongoing RA procedure after switching to a different small data transmission method (e.g. two/four-step RA, on a CG, etc). In some cases, a WTRU may report a link failure to upper layers.

Embodiments directed to load control and backoff are described herein. A WTRU may receive an enhanced back-off indication part of Msg2 or MsgB that includes one or more information. Such information may include, for example, an applicability indication to one or more WTRUs (a group or subset of WTRUs). For instance, a small data bit may be included part of a backoff sub-PDU to indicate that backoff is only applicable to legacy WTRUs or visa-versa (e.g., that backoff is only applicable to small data WTRUs). In another example, the applicability indication may be a unique ID that indicates a subset of WTRUs (e.g. a small data RNTI, an RNTI that corresponds to the identity of single WTRU C-RNTI or I-RNTI). The indication may be conveyed implicitly from the PDCCH resource (e.g. a CORESET or search space) used to schedule the backoff sub-PDU. For example, the WTRU may monitor two search spaces (one for a fallback RAR and another for a RAR indicating success); the WTRU may determine that backoff is applicable if the BI was received on one of the search spaces (e.g. the search space associated with two-step RA), and may not apply the backoff if it was received on the other search space.

The information may include, for example, an indication bit to signal to the WTRU to switch to the different small data transmission method (i.e. different RA resource, switch between two-step or four-step RA procedures, or use a CG) after backoff.

The information may include, for example, an applicability indication to a subset of RA types (e.g. only for four-step RA, only for two-step RA procedures, RA by a small data WTRU vs. RA by legacy WTRU, RA for BFR, RA for mobility, etc.). The WTRU may determine that such indication is for its RA type if an explicit bit in the MAC RAR payload is flagged (e.g. to differentiate from legacy two-step RA WTRUs), if, for example, a certain RNTI associated with the WTRU or the PRACH resource is used to schedule the RAR, if an explicit indication is signalled by DCI, or if an implicit indication is conveyed from the used PDCCH resource (e.g. CORESET or search space). In some cases, the WTRU may determine that such indication is for its RA type implicitly according to the RA type it has used. For example, a predefined rule may be used to signal RA types with reduced backoff or no backoff.

The information may include, for example, an indication to switch to a different RACH resource, a different PUSCH payload resource associated with the selected PRACH resource, a switch between two-step and four-step RA, or a different small data transmission method (e.g. using a CG).

A WTRU may able to determine that a backoff indication is intended only for legacy WTRUs, such as when the WTRU receives a RAR indicating success that is addressed to a small data-RNTI (e.g. not supported by legacy WTRUs) or its I/C-RNTI, in addition to the backoff indication. The WTRU may able to determine that the backoff indication is intended only for legacy WTRUs, such as when the WTRU receives a RAR indicating success on a separately config-ured CORESET or search space that legacy WTRUs do not monitor. The WTRU may thus apply the indicated backoff conditionally on not receiving a success RAR by the expiry of the MsgB/RAR window.

A WTRU may fallback to a legacy RA procedure, retrans-mit the small data using a different method (two-step RA, four-step RA, on a CG), abort the ongoing small data transmission procedure, start a new random access proce-dure, and/or transition into connected mode after N unsuc-cessful attempts of small data transmission, after a certain timer has elapsed, or after reception of an indication to do so in the backoff MAC sub-PDU payload.

The WTRU may attempt to select a different preamble group or PRACH resource, possibly for a different small data payload size, after a number of failed transmission attempts or timer expiry. For example, the WTRU may have selected a PRACH resource or preamble group x over which to transmit a payload of size y and failed to successfully transmit the payload N times (N may be configured, for instance, by RRC signaling). After N failed attempts, the WTRU may select a different preamble group for a smaller payload size less than y. The WTRU may construct a new TB to match the TB size of the selected preamble group and may flush the Msg3 or MsgA payload buffer for the asso-ciated HARQ process.

Embodiments directed to RA prioritization and/or differ-entiation are described herein. In some solutions, a WTRU may apply prioritized, scaled, or different backoff or power ramping if small data was transmitted (e.g. previously included in a MsgA/Msg3 payload) or data from certain LCHs was included in the MsgA or Msg3 payload (e.g. LCHs configured as applicable for small data transmission). In other solutions, a WTRU may apply non-prioritized/non-scaled backoff or power ramping if small data was trans-mitted (e.g. previously included in MsgA/Msg3 payload), data from certain LCH(s) was included in the MsgA or Msg3 payload (e.g. LCHs configured as applicable for small data transmission).

In other solutions the WTRU may apply power ramping only to the PUSCH payload part or to both preamble and payload parts. For example, if an indication was received in MsgB or Msg2 indicating a payload retransmission (e.g. NACK) or a fallback RAR was received addressed to RA/MsgB-RNTI, the WTRU may determine that only the payload transmission failed, and thus, the WTRU may power ramp only the payload transmission.

Various embodiments for performing low-latency trans-missions of small data are described herein. In some embodiments, a WTRU may be configured with conditional or contention free RA or CG resources, such as four-step, two-step CFRA, and/or other CG resources. possibly with a list of applicable logical channels, DRBs, and/or SRBs. The WTRU may be configured with a one-to-one or a one-to-many mapping between a CFRA preamble and a PUSCH resource. The WTRU may persist in using or having dedi-cated CFRA configurations upon transitioning into inactive state. The WTRU may determine the UL grant and the associated HARQ information for the MsgA according to the selected PUSCH resource and an associated RRC con-figuration.

In some embodiments, a WTRU may select conditional/contention-free resources if the highest priority data or LCH with buffered data for small data transmission is above a threshold, and/or if CCCH or SRB data is buffered for transmission. The WTRU may select conditional/conten-tion-free resources if at least one LCH with buffered data for small data transmission is configured to be applicable for a conditional/contention-free small data resource. The WTRU may select conditional/contention-free resources if at least one LCH with buffered data for small data transmission is configured as applicable for small data, i.e. per LCH/DRB/LCG/QoS flow configuration small data applicability by RRC configuration. In some methods, the WTRU may select a conditional/contention-free resource based on a latency requirement (e.g. traffic periodicity, survival time, and/or HOL delay) of an associated LCH with buffered small data. For example, the WTRU may select such resource if the traffic periodicity, survival time, and/or HOL delay of the associated LCH with buffered small data is less than a threshold or can be maintained using the selected resource. A WTRU may prioritize the selection of a two-step RA or CG without preamble small data transmission methods over four-step RA methods, if the required latency cannot be met with small data transmission over four-step RA In some embodiments, a WTRU may select a conditional/contention-free resources if a measured channel condition is above a configured threshold. For example, the WTRU may select a certain conditional resource if RSRP is above a threshold. The WTRU may select conditional/contention-free resources if the uplink timing is maintained, e.g. if an uplink timing synchronization timer is running, if the estimated propagation delay is less than a configured threshold, and/or if the WTRU receives or maintains a certain UL timing advance command.

In some embodiments, the WTRU may select conditional/contention-free resources if it receives a PDCCH paging with a specific RNTI (e.g., I-RNTI or P-RNTI), if it receives an indication on PDCCH on a preconfigured coreset or search space, if it receives associated downlink control information or data, and/or if it receives downlink small data. For example, a WTRU may receive (e.g., dynamic) signalling to suspend and/or resume the usage of a small data resource. A WTRU may receive an indication by DCI and/or receive an indication in a MAC CE that indicates the suspension or resumption of small data transfer for any of one, a subset, or all small data transmission resource. The WTRU may receive such indication in any of a PDSCH msgB, msg2, and/or msg4), in a DL TB and/or as part of a Li or L2 payload. The WTRU may also receive such indication on another resource, such as PDCCH (e.g., via DCI). Upon reception of a suspension indication. the WTRU may stop using the associated small data resource for a period (e.g, until receiving a resumption indication and/or upon expiry of a backoff timer). The WTRU may start a backoff timer upon reception of a suspension indication. Upon expiry of the backoff timer, may then resume using the resource for small data transfer.

In some embodiments, the WTRU may fall back to small data transmission on contention-based resources, e.g. if the small data transmission does not succeed on the conditional/contention-free resources. The WTRU may start a timer after transmission of uplink data on a conditional/contention-free resource. The WTRU may stop the timer upon succeeding in transmitting small data on the conditional/contention free resource. Upon expiry of the timer, the WTRU may attempt to retransmit small data on contention-based resources. In one method, the WTRU may start with attempting to transmit small data on a contention based resource (e.g. RA or CG based) then switch to transmit or retransmit small data on conditional/contention-free resources after receiving an indication from the nodeB (e.g., gNB). The WTRU may transmit on conditional/contention-free resource after receiving an indication from the nodeB, whereby the indication can be signalled to the WTRU in PDCCH signalling, indicated part of Msg2 or MsgB, or indicated using a MAC CE or part of the MAC CE.

In some embodiments, such as in legacy systems, a WTRU may select a two-step RA resource only if RSRP is above a configured threshold. Further, the WTRU can select CFRA resources if a RSPR is above a threshold. the WTRU may be configured with both two-step and four-step resources in the same BWP.

In one method, the WTRU may select CFRA and/or two-step RA resources even if RSRP is lower than threshold for selecting two-step RA resources. For example, the WTRU may select two-step CFRA if timing alignment timer is running and/or if small data is buffered for a LCH configured for low latency traffic for transmission on the CFRA resource. For example, the WTRU may select two-step CFRA if uplink timing is maintained by the WTRU, if propagation delay is compensated for, and/or if the WTRU has not moved since transitioning to IDLE or INACTIVE state. The WTRU may ignore the RSRP threshold for selecting contention-free and/or two-step RA resources, if a two-step CFRA resource is available and can be selected (e.g. if RSRP is above the configured threshold applicable for selecting the CFRA resource). The WTRU may monitor a PDCCH transmission addressed to I-RNTI and MsgB-RNTI for reception of MsgB or a fallback RAR, possibly if it selected a two-step CFRA resource though the RSRP is less than the threshold configured for two-step RA resource selection. To enable fallback to CBRA, the WTRU may limit transmitting small data on CFRA resources only if the active BWP contains CBRA resources. To enable fallback to four-step RA procedure, the WTRU may limit transmitting small data on CFRA resources only if the active BWP contains four-step RA resources. The WTRU may fall back to CBRA resources and/or four-step RA resources to retransmit the small data after a number of configured attempts on CFRA resources. The WTRU may fall back to CBRA resources and/or four-step RA resources to retransmit the small data after expiry of a timer. The WTRU may start a timer at the first attempt to transmit small data on contention-free and/or two-step RA resources, possibly only if the RSRP is less than the threshold required for selecting contention-free and/or two-step RA resources.

Various embodiments relating to HARQ feedback and retransmission are described herein. In a RA based procedure, a WTRU may send a limited amount of data in a Msg3 or MsgA transmission on a PUSCH. In four-step RACH procedure, the WTRU may determine PUSCH time and/or frequency resources with an UL grant in a Msg2 transmission. In two-step RA procedure, the PUSCH time/frequency resources may be determined by an association with a preamble index (RAPID). The WTRU may determine its data transmission is successful when it detects a Msg4 transmission addressed to its RNTI or when it detects a MsgB transmission with a RAR indicating success. A WTRU may acknowledge successful reception of a Msg4 or MsgB by sending an acknowledgement (ACK) over a PUCCH. However, a WTRU may send data larger than supported by one Msg3/MsgA procedure. A nodeB may include a subsequent UL grant in Msg4 or MsgB, but a WTRU may be unable to determine if its subsequent UL transmissions in grants are successful. In the following, solutions may be described for the WTRU to verify the subsequent data transmitted on the subsequent grant. Solutions may also be described for sending multiple retransmissions without waiting for HARQ feedback.

In some solutions, a WTRU may perform HARQ procedures for one or more burst transmissions following a Msg3 or MsgA transmission. In one such solution, a WTRU may use an implicit ACK notification based on a configured timer. For example, a WTRU may send its subsequent data burst and may start a timer at the start or end of the burst. The WTRU may be configured to monitor for an ACK which may be transmitted in a Msg4 or MsgB transmission. A WTRU may determine to perform retransmission of the burst if no ACK is received within the timer's validity period.

In some solutions, a WTRU may determine that additional burst transmissions failed if a WTRU detects a retransmission request. For example, a Msg4 or MsgB transmission may carry an UL grant for the WTRU to transmit additional data bursts. A WTRU may transmit the additional bursts and the retransmission request may be determined as the WTRU monitors for an explicit RAR, such as a retransmissionRAR, indicating retransmission resources. A NodeB may monitor for the additional data bursts on the resources indicated by the UL grant. A WTRU may determine that a retransmissionRAR MAC PDU indicates that the subsequent transmission failed and need to be retransmitted. The retransmissionRAR may be carried in a Msg4/MsgB addressed with a Msg4-RNTI or MsgB-RNTI. A WTRU may be configured with a timer window and a WTRU may keep monitoring for a retransmissionRAR within the timers validity period. If a WTRU does not receive a retransmissionRAR, the WTRU may determine that its transmission burst has been successfully received. In another method, if a WTRU does not receive a retransmissionRAR by the expiry of the timers validity period, the WTRU may determine that its transmission burst is unsuccessful, the WTRU may retransmit the small data payload on the next applicable PUSCH and/or PRACH resource.

In some solutions, a WTRU may receive an ACK/NACK based on a paging. A WTRU may receive an indication in MsgB with an RNTI for a paging channel. A WTRU may monitor for a paging channel with the specific RNTI and/or a specific time window. The paging channel may contain a message indicating an ACK or NACK and the time/frequency resources for a retransmission if needed. In some methods, the WTRU may monitor PDCCH for HARQ feedback the next 'On' duration configured for paging DRX, after small data transmission or reception and/or subsequent small data transfer. The WTRU may monitor a specific coreset, search space, or RNTI for the reception of HARQ feedback or retransmissions. The WTRU may further provide HARQ feedback for received DL small data during the next 'On' duration configured for paging.

Solutions relating to HARQ feedback-less transmissions and TB repetitions are described herein. To reduce latency and increase reliability, a WTRU may determine to send multiple repetitions of a TB before receiving a HARQ response from the nodeB. The WTRU may stop transmitting the repetitions upon determining an ACK or counting a certain number of repetitions. The WTRU may determine the resource configuration to be used for the repetitions in the one or a combination of ways. For example, a WTRU may determine to reuse the same resources for the retransmission as the original transmission with a timing offset for each repetition, or a WTRU may be configured with retransmission parameters as a function of the retransmission index.

In some cases, a WTRU may determine the location of the time and/or frequency resources based on a preamble. The preamble may be preconfigured with a link to multiple sets of resources in time or frequency. The WTRU may initiate a transmission using a RACH procedure by sending a preamble and transmitting the TB repetitions over the multiple linked resources. The nodeB may detect the preamble and determine on which resources the repetitions are sent by the WTRU. The multiple resources may be linked across the same RACH occasion in the same time instant and different frequency instants, or across different time instants.

In some cases, a WTRU may determine the parameters of the TB repetitions based on the preamble. For example, a preamble may be linked to multiple redundancy versions (RVs) configured in a sequence and the WTRU may determine to use a sequence of RVs based on the sequence of TB repetitions.

In some cases, a WTRU may determine the timing of the TB repetitions based on the preamble. For example, the preamble may be linked to one or a plurality of timing values where the WTRU may determine the timing of the TB repetition to send. The WTRU may use multiple explicit timing values as offsets relative to the preamble transmission to determine the time location of each TB repetition.

In some cases, a preamble may be linked to one offset from which the WTRU may determine the repetitions to be sent; the repetitions may then be sent as a function of the offset. The WTRU may be preconfigured with an offset or it may receive the timing offset dynamically as T_offset. For example, the WTRU may determine the time location of repetition 1 as $T\_1=i1*T\_offset$, and the time location of another repetition as $T\_2=i2*T\_offset$, where i1 and i2 may be, for example, the repetition number.

A WTRU may receive, in MsgB, a RAR that may contain an indication of time/frequency resources over which the WTRU may send its subsequent data transmissions. The time/frequency resources for retransmissions may be linked to different RACH occasions in the subsequent timing instances. MsgB may contain an index of the RACH occasions from which a WTRU may determine the available PUSCH resources for its subsequent transmission bursts.

In some embodiments, a WTRU may perform a hybrid RA procedure and use a configured grant to transmit an additional payload. For example, the WTRU may initiate a RA procedure and then may use a configured grant to send a payload that may be larger than supported in the RA procedure by the payload resources (e.g., Msg3 or MsgA). The RA procedure may be used to determine or trigger the configured grant resources to use. For example, a WTRU may indicate a subsequent transmission part of the RA procedure, and may then receive the configuration for the configured grant (e.g., in a MsgB or Msg4).

The hybrid solution may be supported in one or more ways. For instance, a WTRU may send a preamble and/or a PRACH resource, and the preamble may be linked to a configured grant resource index. The preambles and/or ROs may be partitioned according to the random access preamble ID (RAPID) into regions where the nodeB may implicitly determine which configured grant is used by the WTRU. For example, preambles 1:N1 may be linked to configured grant (CG) resource 1 and/or TBS 1, and preambles N1+1:N2 may be linked to CG resource 2 and/or TBS 2. A WTRU may determine which CG resource to use based on payload size and/or latency. For example, reception of a predetermined or configured message (e.g., a MsgB or Msg4) may implicitly activate the CG resource associated with the RA resource, or may provide a (e.g., explicit) configuration of the CG resource.

In some solutions, the WTRU may determine a configured grant resource index and may include one or more indices in a Msg3 or MsgA payload. The NodeB may determine that the payload contains a configured grant index based on the RAPID or based on the location of the payload resources. For example, one preamble may link to a subset of PUSCH resources which may be reserved for requests for a configured grant. The nodeB may decode the preamble and may expect to receive the index of the configured grant in the corresponding payload.

In some solutions a WTRU may indicate a priority level in Msg3 or MsgA and may use a configured grant resource that may be associated to the priority level. For example, some resources may be reserved for URLLC traffic. In other solutions, the WTRU may scramble its MsgA payload with a special RNTI (e.g. smallData-RNTI) to implicitly indicate to the nodeB the index of the used type 1 configured grant. The smallData-RNTI value may be partitioned such that the WTRU may choose values within a range to implicitly indicate the configured grant resources to be used. For example, the MsgA PUSCH scrambling may be initialized with a seed depending on the configured grant index.

In some solutions, a WTRU may send a preamble to trigger the activation of a type 2 configured grant resource. For example, a WTRU may transmit a preamble that may be configured to trigger the nodeB to send a PDCCH addressed to a CS-RNTI, C-RNTI, or I-RNTI upon detection of the preamble. The WTRU may monitor one or more PDCCHs for the activation of the applicable configured grant after transmitting the indication on Msg1 or MsgA (e.g., as an indication for a subsequent data transmission). The WTRU may monitor one or more PDCCHs for CG activation, or deactivation, after small data transmission (e.g., on MsgA, Msg3 and/or CG), after successful completion of a RACH transmission, and/or after providing a subsequent data transmission.

In some solutions, a WTRU may include an indication in a MsgA payload that the WTRU requests for a configured grant (e.g. BSR). For example, such an indication may be an indication for subsequent data transmission (e.g., a flag bit), a BSR MAC CE, a data volume MAC CE, and/or a small data BSR MAC CE.

In some solutions, a WTRU may trigger a type 2 configured grant based on the scrambling used for msg3/msgA payload. For example, a WTRU may use an RNTI to scramble its data payload and the RNTI may be partitioned according to payload ranges required by the WTRU. The nodeB may decode the RNTI and it may have an indication of the payload required by the WTRU. The gNB may trigger a type2 configured grant with a resource configuration satisfying the WTRU's request.

In some embodiments, a WTRU may receive a dedicated grant (e.g. a configured grant), the UE may prioritize the selection of such grant for the transmission of small data over other available RACH resources, possibly conditioned on: not changing serving cells, not changing the cell group, not changing RNAs, and/or having the UE context known at the receiving gNB. In one method, the UE may deem a CG resource usable in a cell in INACTIVE/IDLE state if a successful RACH procedure was performed in that serving cell—or cell group-prior to using the CG.

Upon reception and/or activation of a CG (e.g., an INAC-TIVE/IDLE CG), a WTRU may use a CG for small data transfer for a configured period of time, after the expiry of such period the UE may fallback to using RACH-based small data transfer. Such period can be determined by the TA timer or a separate new TA timer associated with the CG.

Embodiments directed to HARQ process ID provisioning in idle/inactive modes are described herein. In legacy RA, the WTRU may use HARQ process ID '0' for storing and transmitting the PDU associated with msg3 or MsgA. The WTRU may need to transmit multiple small data TBs without going into connected mode.

The WTRU may be configured or predefined with a subset of HARQ processes applicable for small data transmission, e.g. in INACTIVE or IDLE modes. The WTRU may be configured by semi-static or broadcast signalling with this subset of HARQ process IDs. The WTRU may be indicated the HARQ process ID applicable for small data transmission in Msg2 or part of PDCCH signalling.

In some methods, the WTRU may select the HARQ process ID associated with data transmission, e.g. from a pool of configured HARQ process IDs. The WTRU may indicate the selected HARQ process ID associated with small data transmission part of the PUSCH transmission (e.g. UCI on PUSCH, part of MsgA or a CG transmission without preamble), part of the MAC CE, an indicated part of MsgA payload, or part of the small data payload.

For two-step RA, the WTRU may be configured or predefined with a mapping between a subset of PRACH and/or PUSCH resources associated with MsgA and one or more HARQ process IDs, where the resource can be specified by the time, frequency, and/or preamble domain. For example, the WTRU can be configured with a mapping between PUSCH resource(s) x and HARQ process ID y, PRACH resource(s) x and HARQ process ID y, and/or a group of preambles and a HARQ Process ID.

In some methods, the WTRU may determine the HARQ process ID from the time and/or frequency used to transmit the preamble/MsgA, from the RA-RNTI, and/or from MsgB-RNTI. The WTRU may be predefined with a formula to determine the HARQ PID to use for a small data UL TB. The WTRU may determine the PID from the PRACH and/or PUSCH occasion used to transmit the small data. The WTRU may be configured with a pattern such that a subset of PRACH and/or PUSCH occasions share the same HARQ process ID periodically. For example, the WTRU may cycle consecutively through the configured number of HARQ-Processes applicable for small data transmission, whereby the WTRU may increase the HARQ PID once per configured incremental period. For example, a sample formula can be:

$$Process\ ID = [floor(CURRENT\_slot/periodicity/scale)]$$
$$modulo\ nrofHARQ\text{-}Processes$$

where "current slot" may be the slot used to transmit PRACH or PUSCH associated with the small data. The WTRU may only count—or increment the count-slots applicable for RACH and/or PUSCH applicable for data transmission. This can be alternatively replaced with a currently symbol. In another example, the current slot can be computed as "current slot number modulo pattern," where "pattern" may be the number of slots used for the same HARQ PID. "Periodicity" may be the periodicity of the PRACH or PUSCH resource applicable for small data transmission. The WTRU may consider the periodicity as the period between PRACH and/or PUSCH resources that do not share the same HARQ Process ID, or the period between PRACH and/or PUSCH resource that are configured to have the same process ID. "Scale" may be 1 by default or a different value that can be used by the NW to scale the increase. "nrof-HARQ-Processes" may be the number of HARQ process applicable for small data transmission; such value may be configured by RRC configuration.

In some methods, the WTRU may start a parallel RA procedure for each small data transmission associated with a different HARQ process ID. The WTRU may maintain separate preamble and power ramping counters per RA procedure. For small data transmitted without preamble, the WTRU may maintain a CG timer per HARQ process applicable for small data transmission.

In some embodiments, the WTRU may toggle NDI and/or flush the buffer(s) for HARQ process ID(s) associated with small data transmission in IDLE or INACTIVE on one or more of several conditions. For example, the WTRU may toggle NDI and flush the buffer(s) for HARQ process ID(s) associated with small data transmission in IDLE or INAC-TIVE after succeeding a small data transfer procedure, upon successful reception of MsgB (e.g. success RAR), upon providing HARQ-ACK==ACK for MsgB, upon successful reception of Msg4, upon succeeding the associated RA procedure, and/or upon receiving a HARQ-ACK value for the small data TB transmitted, and/or upon expiry.

As described herein, in some embodiments, a WTRU may be able to transmit small data in inactive or idle modes using a configured grant PUSCH resource, without an associated preamble transmission. Such transmission can be viable when uplink timing advance is not necessary, already known or maintained, or does not change drastically. In some cases, the WTRU may receive a configuration (e.g. by broadcast or RRC signaling) whether small data transmission is appli-cable on the cell for one or more configured grants in idle and/or inactive modes. Such configuration can be either dedicated (per Cell ID, and in HO command) or provided by broadcast system information signalling.

In some solutions, the configuration could indicate whether or not the WTRU may use small data transfers (i.e., without transitioning to a connected mode) and if so, whether or not it should use PRACH and/or transmit an accompanying preamble. In some methods, the WTRU may be configured with criteria for using an accompanying PRACH, such as a range of channel conditions, TA, S-mea-sure, a CRE region, or L3 channel measurements. In some cases, the WTRU may be further configured (e.g. by broad-cast or RRC signalling) with associated transmit power parameters. A nominal target power, Po, may be broad-casted, possibly also per range based on factors such as an S-measure.

Embodiments directed to resource selection for HARQ processes are described herein. In some solutions, config-ured grants may be shared with other WTRUs, thus creating a possibility of contention and collision. A WTRU may repeat a TB transmission in the time and/or frequency domain for example, using frequency hopping, TTI bundling with RV sequencing, or one or a combination of other methods. Collisions between WTRUs may occur due to more than one WTRU selecting the same time/frequency resource for small data transmission, or due to uplink timing misalignment in inactive or idle modes. The CG resource used for small data transmission in inactive or idle mode may be shared with other WTRUs in connected mode, or the CG resource may be shared with WTRUs using the same resource for transmission of the MsgA PUSCH payload.

In some solutions, in connected mode, if a collision on CG happens and the network cannot decode a conflicting trans-mission, a network (NW) may issue a dynamic grant to a WTRU to separate the collisions. Given the WTRU may not monitor C-RNTI in inactive mode, the WTRU may monitor one or more PDCCHs scrambled by I-RNTI, C-RNTI, CS-RNTI and/or another small data RNTI during a moni-toring window after the UL transmission. The WTRU may start a PDCCH monitoring window, such as a CG response window, during which the WTRU may monitor the PDCCH, possibly on certain configured CORESETS, search spaces, and/or RNTIs (e.g. I-RNTI, C-RNTI, CS-RNTI an/or a small data CG-RNTI). The window and related parameters may be configured by broadcast or RRC signaling for example, per cell or per CG resource. For example, upon expiry of the CG response window, the WTRU may deter-mine the small data transmission to have failed, may initiate a small data retransmission on a PRACH resource, and/or may switch to a different BWP or serving cell to perform a retransmission. The UE may start, or restart, the CG response window after any of performing a new small data transmission, receiving a TA value, receiving a TA command (e.g., via MAC CE), receiving an indication for a retrans-mission grant (e.g., via DCIO, and/or receiving any of a Msg2, Msg4 or MsgB.

In some solutions, a WTRU may compute a small data CG-RNTI as a function of the time and frequency domain resource allocation of the selected CG and the selected PRBs on which the small data were transmitted. For example, a WTRU may receive RRC signalling to configure a small data CG-RNTI for a given CG. The WTRU may discard the small data CG-RNTI after changing to a different cell or cell group and/or after expiry of the CG response window.

In some cases, the WTRU may receive a small data response (SDR) during the CG response window. The SDR may include one or more types of information. For instance, the SDR may include an uplink grant for a retransmission or a subsequent transmission. For example, the WTRU may receive a dynamic UL grant for the same HARQ process ID for retransmitting the small data TB. The WTRU may receive an UL grant with a different HARQ PID or the same HARQ PID with a new data indicator (NDI) toggled for the purpose of transmitting subsequent or further small data. The WTRU may monitor the PDCCH, possibly for a dura-tion matching the configured window, after transmission or retransmission of small data on a grant provided for retrans-mission of small data or transmission of subsequent small data.

In some solutions, the SDR may include HARQ-ACK information relating to the transmitted TB. The WTRU may receive an explicit HARQ-ACK, for example, on a downlink control channel. The WTRU may determine the HARQ-ACK implicitly from the NDI value for a subsequent sched-uled grant for the same HARQ process used to transmit the small data TB. For instance, the WTRU may determine an ACK if the NDI is toggled for the same HARQ process in a subsequently scheduled grant. The WTRU may also deter-mine a HARQ-ACK value based on the expiry of a timer, such as the CG response window or the CG timer, if configured. For example, the WTRU may determine ACK if the CG response window has expired and the WTRU has not received a subsequent UL grant for the same HARQ process ID.

In some solutions, the SDR may include a backoff indi-cation and backoff time. A WTRU may retransmit the small data TB on the same or a different CG after receiving a backoff indication and waiting for a backoff period.

In some solutions, the SDR may include an applicability indication for one or more WTRUs, or a group or subset of WTRUs. For example, a bit may be included part of the backoff MAC sub-PDU or in a DCI indicating that backoff is only applicable to WTRUs capable of small data trans-mission or only applicable to WTRUs in inactive or con-nected modes. In another example, the applicability indica-tion may be a unique ID to indicate a subset of WTRUs, such as a small data RNTI, a CG-RNTI, or an RNTI that corresponds to the identity of single WTRU C-RNTI or I-RNTI.

In some solutions, the SDR may include an indication bit to signal to the WTRU to switch to the different small data transmission method, possibly after backoff. For instance, the indication bit may signal to switch to different CG resources, initiate a two-step or four-step RA procedure for small data transmissions or retransmissions.

In some solutions, the SDR may include a timing advance or a timing advance adjustment. The SDR may include an incremental timing advance delta or an absolute timing advance value, and the WTRU may apply or adjust the signalled TA for the upcoming retransmissions or any uplink transmission.

In some solutions, the SDR may indicate whether to apply power ramping for a retransmission on CG. The SDR may provide an indication to retransmit a different CG resource, possibly after backoff, or the SDR may provide an indication to retransmit the payload on the same CG resource but with a preamble, such as when the CG is also used for transmission of the data payload of a two-step RA procedure.

In some solutions, a WTRU may determine (e.g., implicitly) that a TB transmission was successful, or unsuccessful, upon receiving an indication (e.g. ACK) in an SDR applicable to the WTRU, or upon expiry of a CG response window without reception of applicable scheduling for the WTRU. In some solutions, the WTRU may assume the TB transmission was unsuccessful (e.g. NACK) upon failing to receive an SDR applicable to the WTRU by the end of the CG response window.

In some solutions, the WTRU may apply power ramping for a retransmission on a CG, possibly upon reception of a backoff indication. The WTRU may apply power ramping, for example, depending on whether the same CG resource, same uplink beam, same uplink, and/or same uplink carrier was selected. The WTRU may maintain a power ramping counter associated with small data transmission on CGs. The WTRU may be configured via RRC signaling with a maximum number of transmission attempts. The WTRU may also be configured with a power ramping step via RRC signaling and use that value upon ramping power. The WTRU may alternatively determine the power ramping step based on the TB size. For example, the WTRU may scale the configured power ramping step or select a different power ramping step if the TBS is larger than, or smaller than, a certain threshold. In some solutions, the WTRU may apply a prioritized/scaled backoff or power ramping if small data was transmitted and data from certain LCHs was included in the TB.

Further embodiments directed to CG and resource selection are described herein. In some solutions, a WTRU may have one or more CGs configured for small data transmission, possibly on different carriers and/or different uplinks. The WTRU may be able to select a configured grant for small data transmission if one or a combination of conditions are met. For example, the condition may be based on a TBS. The WTRU may be configured with a TBS range per CG for the purpose of selecting a CG. The WTRU may select a CG if the amount of buffered data from LCHs applicable for small data transmission falls within the configured TBS range for the CG. In one example, when one or more CGs are available, the WTRU may select the CG with the smallest TBS that would fit the buffered small data.

In some cases, the condition may be based on based on channel conditions. The WTRU may be configured with channel condition range or threshold, such as an RSRP, pathloss, or power headroom. The WTRU may select a configured grant for small data transmission if the measured channel condition is within the configured range or less than the threshold. In some examples, a channel condition range or threshold can be configured collectively per uplink or per uplink carrier (i.e. for all configured grants on the same uplink or the same uplink carrier). A WTRU may combine this selection criterion with the TB size; for example, the WTRU may select CG 1 if the TB exceeds a threshold for CG1 and if pathloss is less than a threshold, or if RSRP exceeds a threshold.

In some cases, the condition may be based on one or more timing advance (TA) values. In one example, the WTRU can be configured per cell with a range of TA values for which the WTRU is allowed to use configured grants or an uplink carrier for small data transmission in idle or inactive modes. The WTRU may maintain the TA value last used upon transitioning from connected mode. With such configuration, the WTRU may transmit small data on the configured CGs if the TA is within the applicable range, or the WTRU may use a RA-based small data transmission. The WTRU may further determine that a CG is applicable for small data transmissions if the maintained TA value has not changed for configured period of time. In another example, small cells may lack UL TA issues, so there may be no need for a timing advance, but power ramping could be used on PUSCH, for example, for HARQ retransmissions. In some methods, the WTRU may select a CG for transmission only after having received a TA command in INACTIVE state.

For example, a WTRU may maintain a TA timer for the maintenance of the TA (e.g., in inactive/idle states) and/or for determining whether a CG can be used for small data transmission. The WTRU may start, or restart, the TA timer upon receiving a TA command (e.g., in a MAC CE), upon transitioning into inactive state, and/or upon receiving a TA command as part of a RA procedure (e.g., in Msg2or MsgB). The WTRU may assume the CG to be valid for small data transmission while the TA timer is running (e.g., not expired). Upon expiry of the TA timer, the WTRU may use a RACH resource for small data transfer.

As another example, the WTRU may extend the maintenance of the TA timer to inactive and/or idle modes. The WTRU may start, or restart, the TA timer upon any of receiving a TA command (e.g., in a MAC CE), transitioning into the inactive state, and/or receiving a TA command as part of a RA procedure (e.g., in Msg2 or MsgB). The WTRU may assume a CG to be valid for small data transmission while the TA timer is running (e.g., non-expired), In some cases, the condition may be based on the selected uplink, for example, whether a normal uplink (NUL) or a supplementary uplink (SUL) is selected. The WTRU may only consider CGs in the active BWP and selected uplink. The WTRU may perform an uplink selection method prior to CG selection, for example, based on the measured RSRP. The WTRU may then select CGs configured on the selected uplink carrier, active uplink carrier, and/or active BWP. In some cases, the condition may be based on measured channel conditions. Measured channel conditions may be expressed in terms of an S-measure, a CRE region, and/or L3 channel measurements. For example, the WTRU may select a given CG resource for small data transmission if a certain RRM synchronization criterion is determined, such as if one or more RRM measurements are above a configured threshold or within a range. The WTRU may consider the CG resource as not applicable for small data transmission otherwise, such as if the synchronization criterion is not satisfied.

In some cases, the condition may be based on the LCH on which data is buffered/to be transmitted. For example, the WTRU may select a certain configured grant in inactive state only if the LCH with buffered small data is configured with an LCP restriction allowing data transmission on that grant. Each LCH may be configured with a list of applicable CGs for transmission in inactive or idle states.

In some cases, the condition may be based on priority (e.g. LCH priority, access class priority, upper layer access identity, QoS requirements configured for the associated DRBs). The WTRU may use a CG for small data transmission only if data is associated with certain priority or access identity. CGs may be configured by RRC with the list of applicable priorities, QoS requirements, and/or access identities.

In some cases, the condition may be based on whether SRB data is to be transmitted using part of the small data PDU. For example, the WTRU may use a CG for transmission only for DRBs (or a subset of DRBs).

Various procedural aspects of small data transmission are described herein. In some cases, such as when a WTRU is mobile, small data transmissions may be performed with or without anchor relocation. If a WTRU moves around while in idle or inactive mode and changes coverage area (RAN paging area), the WTRU may transmit a packet in a new coverage area, possibly if certain conditions are met. The WTRU may transmit data to the target nodeB if the WTRU context is kept or maintained at the target nodeB. The WTRU may trigger a RA procedure transmit data if the context is not known at the target nodeB. The WTRU may include such Resume ID, which may provide the AS context to the target nodeB, in such RA.

Depending on the circumstances, a small data format may vary, and a WTRU may include one of several types of information in a small data PDU, sub-PDU, or MAC CE. For example, the WTRU may include data from one or more LCHs. The WTRU may be configured with a subset of LCHs that are applicable for small data transmission. The WTRU may include the WTRU's resumeID, which may enable the network to transition the WTRU to connected mode (e.g., RRC resume request). The WTRU may also include the WTRU's I-RNTI or C-RNTI.

In some cases, the WTRU may include a BSR or amount of remaining small data, or a "small data BSR." This may include, for instance, data for small data LCHs, which may be LCHs configured as applicable for small data transmissions. The BS level may be estimated or indicated as a pointer to a predefined range of bits index.

In some cases, a WTRU may include an indication as to whether subsequent data is to follow. For example, the WTRU may include a bit indication if buffered small data is greater than zero or greater than a configured threshold after TB construction, possibly only counting buffered bits from LCHs configured as applicable for small data transmission.

In some cases, a WTRU may include scheduling information, which may further include CSI reports or power headroom (PHR). The WTRU may include such information in certain conditions, such as when a PHR or CSI report is triggered or the delta since the last report is larger than a certain threshold.

In some cases, a WTRU may include a selected preamble (RAPID), which may be helpful in decoding collisions at the received if a 1-1 mapping between the PRACH resource and the PUSCH resource does not exist. In some cases, the WTRU may include an acknowledgment (e.g., HARQ-ACK) for a previously received TB. In some cases, a WTRU may include a HARQ process ID associated with or used to store the small data TB.

In some cases, a WTRU may include an RRC message (e.g., RRC resume), such as when the context is not known at a target (e.g., a serving gNB). The WTRU may include the RRC message as a function of a resource used. For example, a WTRU may include an RRC message upon condition that RACH-based small data resources are used and not include it upon condition that CG resources are used to transmit the small data PDU, A WTRU may exclude the RRC message if the serving cell hasn't changed since the WTRU has acquired the CG configuration, A WTRU may exclude the RRC message if the WTRU has already sent an RRC resume request and the serving cell has not changed (e.g., since the RRC resume request was sent).

In some embodiments, a WTRU may be configured for small data transmission via RRC or broadcast signalling with one or a combination of types of information. For example, a WTRU may be configured with dedicated (two-step, four-step, or CG) resources, which the WTRU may maintain when entering inactive and/or idle mode. The WTRU may be configured with a subset of PRACH and/or PUSCH resources applicable for small data transfer. The WTRU may configured with an indication whether HARQ feedback is used, for which a WTRU can be configured per resource or UL transmission method (two-step, four-step, or CG).

The WTRU may be configured with small data applicability per LCH, DRB, LCG, or QoS flow configuration. For example, when small data transmission is applicable, the WTRU may restrict small data transmission to a subset of LCHs. In some cases, this may be an LCH restriction in LCP for instance. The WTRU may be configured with a small data LCP restriction for a subset of LCHs, whereby the WTRU only includes data from those LCHs for resources applicable for small data transfer. In some cases, certain DRBs may be suspended in inactive or idle mode. The WTRU may be configured via RRC signaling per DRB with information whether the DRB is maintained or suspended in idle and/or inactive mode.

Conditions for successfully performing small data transmission procedure are described herein. In some embodiments, the WTRU may consider a small data transfer procedure successful, or unsuccessful, possibly per HARQ process applicable for small data, if at least one of several conditions occur. Such conditions may include reception of MsgB, possibly with I-RNTI or RNTI provided in MsgA. The RNTI can by scrambled in the PDCCH that scheduled MsgB or provided in the contents of MsgB.

Conditions for successful small data transfer may include reception of Msg4, possibly with I-RNTI or RNTI provided in MsgA or Msg3. The RNTI can by scrambled in the PDCCH that scheduled MsgB or provided in the contents of Msg4. Conditions for successful small data transfer may include delivering HARQ-ACK with ACK for MsgB. The WTRU may consider the small data transfer procedure successful after deliver a HARQ-ACK value for the small data PDU transmitted or received, possibly with the condition that the value is equal to "ACK". Conditions for successful small data transfer may include reception of a TA command MAC CE. Conditions for successful small data transfer may include, for example, the WTRU determining it has no further small data to transmit from the buffer status, based on not sending a request to transmit further subsequent small data, or not receiving an indication from the network for small data transfer. Conditions for successful small data transfer may include reception of HARQ-ACK for transmitted small data or reception of a PDCCH transmission on a certain CORESET or search space. A WTRU may consider the procedure successful upon determining an ACK for the corresponding HARQ process. Conditions for successful small data transfer may include expiry of a timer. A WTRU may consider the procedure successful, or unsuccessful, upon expiry of a timer. In some examples, the WTRU may consider the procedure successful upon not receiving a retransmission grant or a grant for subsequent transmission within a time duration within the transmission of the small data PDU (initial or subsequent). The WTRU may maintain a timer for such purpose (e.g., a small data retransmission timer or small data failure handling), and may reset the timer each time small data is transmitted, upon reception of a fallback RAR, or upon expiry of the contention resolution timer without receiving a Msg4. The WTRU may stop the timer upon determining a ACK is received. The WTRU may start the timer (e.g., only) for the first transmission attempt for a small data packet and/or without consideration to retransmissions and/or subsequent transmissions/segments.

Upon condition that a small data transfer procedure has failed and/or upon condition that the timer has expired, the WTRU may perform procedures and/or actions related to any of cell re-establishment, RRC re-establishment, DRB suspension, transitioning to IDLE mode and/or initiating a new RACH procedure (e.g., on a different cell and/or BWP). For example, the WTRU may transmit an RRC connection resume request, a RRC establishment request, and/or RRC reestablishment request. While the timer is running, the WTRU may remain in INACTIVE state. In some cases, the WTRU may remain in the INACTIVE state even if another event that triggers the WTRU to go to IDLE mode may have been triggered (e.g., cell reselection). The WTRU may maintain any unacknowledged small data in the buffer while the timer is running. In some cases, the timer can be maintained per MAC entity, per DRB, or per HARQ process.

A small data transfer procedure may be considered pending by the WTRU until it is successful or cancelled. The WTRU may monitor certain PDCCH resources or search spaces while a small data transfer procedure is pending. The WTRU may perform certain L1, L3, CSI, and/or RRM measurements while a small data procedure is pending.

Embodiments directed to channel measurement and reporting in IDLE and INACTIVE states (e.g., CSI reporting) are described herein. In IDLE and INACTIVE states, a WTRU may monitor SSBs from the serving cell and from neighbouring cells. The WTRU may perform SS-RSRP and SS-RSRQ measurements on the serving cell to determine whether a cell fulfills the cell reselection criteria. If a WTRU is sending small data, a WTRU may also want to send an indication of channel quality (e.g. CSI) that may be used for link adaptation. In some scenarios, however, there may be no method for a WTRU to send channel quality reports in IDLE and INACTIVE states. In the following, a CSI report may include one or multiple types of feedback related to channel quality measurement such as SNR, SINR, RSRP, RI, CQI, MCS.

In some solutions, a WTRU may determine a CSI value and may include it as part of a small data transmission. The CSI may be reported, for example, via a UCI report, via a MAC-CE, or in the small data PDU or a PDU header or subheader. A WTRU reporting the CSI via a UCI report may send its small data using a PUSCH, and a WTRU may multiplex a UCI report in a PUSCH message. A WTRU may determine the resource elements (REs) for the UCI report based on a configuration for small data PUSCH transmissions. The WTRU may determine the configuration based on existing rules for multiplexing UCI in PUSCH, or a new configuration may be determined for PUSCH used in small data. In some solutions, the WTRU may reuse an existing UCI format. Alternatively, a special UCI format may be used for small data transmission with reduced overhead.

In some methods, a WTRU may report a MAC-CE used in IDLE or INACTIVE which may contain a CSI report. For example, the MAC-CE for recommended bit rate query may be used by the WTRU. In some embodiments, a MAC-CE may be with a new format defined for small data transmission which may include a CSI report similar to CONNECTED state (e.g. CQI, RI, and/or MCS).

In some embodiments, a WTRU may determine to send a CSI report based on a configuration by a nodeB (e.g., a gNB). The small data transmission format may be configured with or without CSI reporting embedded. Alternatively, a WTRU may determine the small data format and may determine whether to include a CSI report or not. The WTRU may determine to report CSI based on one or more of several factors as described below.

For instance, the determination may be based on whether the WTRU has more data available to send in its buffer. For example, a WTRU may include a report if the WTRU determines that subsequent transmissions are required, or only if a subsequent transmission contains new data. The determination may be based on the WTRU's buffer status. A WTRU may determine to include CSI report if its buffer content size is above a threshold and/or based on having data buffered from LCH(s) applicable for small data transmission.

The determination may be based on the WTRU's channel condition measurements. A WTRU may determine to include a CSI report if the channel measurements (e.g. RSRP) are above or below a threshold. WTRU may include a CSI report only after measuring a configured subset of CSI-RS resource set(s) and/or SSB(s).

The determination may be based on the WTRU's time since last data transmission. A WTRU may determine to include a CSI report if the time since it last performed an UL data transmission or DL data reception is larger than a threshold. Alternatively or additionally, a WTRU may trigger a CSI report whenever it receives DL data, possibly with a certain priority or from a certain LCH or DRB.

The determination may be made based on a paging message. WTRU may report CSI after reception of paging. A WTRU may receive a RAN paging or CN paging message, and a WTRU may determine the resources to include the CSI report in one or more of a PUCCH following the paging; a PUSCH resource associated with a random access triggered by the paging; a semi-statically configured PUSCH resource; or a RACH procedure. A WTRU may receive a PDCCH order to initiate a RACH procedure and a WTRU may trigger the transmission of a CSI report. A WTRU may determine the resources for the CSI report to be on a PUCCH, or on a PUSCH. The WTRU may determine the PUSCH resources as explicitly indicated in the PDCCH order. The WTRU may determine the PUSCH resources as preconfigured and linked to a PDCCH order. A WTRU may for example determine to use a set of resources that may be configured every T seconds following a PDCCH order. In some embodiments, the WTRU may determine the PUSCH as reserved resources within RACH configuration. For example, PRBs may be reserved following a PDCCH order, and the resources may be linked to preambles. In some embodiments, a WTRU may determine the resources based on the preamble.

The WTRU may determine to report CSI based on a traffic type (e.g. URLLC, eMBB). The WTRU may report CSI if it has buffered small data for transmission or reception for a certain LCH, LCG, DRB, and/or QoS flow.

The WTRU may determine to report CSI upon reception of an indication of DCI or scheduling of PDSCH in INAC-TIVE mode. The indication may be provided to the WTRU as a configured or predefined properly of the PDSCH scheduling.

The WTRU may determine to report CSI based on a slot format indicator. A WTRU may determine based on the SFI that some slots may require a CSI report and others not. A WTRU may include the report if the data is sent in a slot flagged for reporting.

Embodiments directed to various types of measurements are described herein. In some embodiments, a WTRU may or may not have RS available for CSI measurements. For example, a WTRU may not be monitoring CSI-RS in IDLE or INACTIVE mode. Then in one solution, a WTRU may use the latest measurement performed in CONNECTED state if it was done less than T seconds where T may be a configured threshold. Alternatively, a WTRU may perform measurements for spatial filter selection prior to selecting a resource for small data transmission. A WTRU may determine to use these measurements as part of the CSI report.

In some embodiments, a WTRU may determine other measurements using SSBs and a WTRU may use them to determine a CSI. In one solution, a WTRU may include a CSI measurement based on available measurements in IDLE or INACTIVE such as SS-RSRP, SS-RSRQ. Alternatively, a WTRU may determine a bitstring mapped to the channel measurement values and the WTRU may report the bitstring. The bitstring may represent an MCS value based on IDLE or INACTIVE channel measurements. For example, a mapping table may be configured between measured SS-RSRP/SS-RSRQ values and MCS values. A WTRU may use the table to determine the MCS value and a WTRU may include the index of the MCS value in the report.

Alternatively, the channel measurement may be mapped to a range of values and the range may be reported. For example, measurement values falling between X0 and X1 dB may be mapped to bit 0, between X1 and X2 to bit 1, for example.

FIG. 2 is a representative procedure that may be implemented by a WTRU 102 to transmit a small data payload using a SDT resource. As shown in FIG. 2, a WTRU 102 may implement a procedure 200 to transmit SDT data using a SDT resource. At 210, the WTRU 102 may receive information indicating a configuration of one or more small data transmission (SDT) resources. At 220, the WTRU 102 may receive information indicating one or more data radio bearers (DRBs) which support SDT. At 230, the WTRU 102 may receive information indicating an inactive radio net-work temporary identifier (I-RNTI) (e.g., to indicate to transition to inactive mode). In certain representative embodiments, any of 210, 220 and/or 230 may be combined and/or reordered. At 240, the WTRU 102 may determine whether uplink (UL) SDT data for transmission is present in a buffer of the WTRU 102. At 250, on condition that (1) the UL SDT data is determined to be present in the buffer, (2) a size of the UL SDT data present in the buffer is less than a first threshold, and (3) the UL SDT data present in the buffer is for the one or more DRBs which support SDT, the WTRU 102 may, after receiving the information indicating the I-RNTI, transmit at least a portion of the UL SDT data present in the buffer using a SDT resource from among the one or more SDT resources. The SDT resource may, for example, be any of an UL grant provided in Msg2, a Msg3 PUSCH resource, an UL grant provided in Msg4, a MsgA PUSCH resource, an UL grant provided in MsgB, a CFRA resource, or a CG resource as described herein.

In certain representative embodiments, the WTRU 102 may, on further condition that the size of the UL SDT data for transmission present in the buffer is greater than a size of the SDT resource, the transmission at 250 may include transmitting information indicating the size of the UL SDT present in the buffer using the same SDT resource (e.g., as the UL SDT data). As an example, the information indicating the amount of UL SDT present in the buffer may be included in a small data buffer status report (BSR).

In certain representative embodiments, the WTRU 102 may consider whether the amount of all the UL SDT data present in the buffer is less than the first threshold and whether all the UL SDT data present in the buffer is for the one or more DRBs which support SDT at 240. In other representative embodiments, the WTRU 102 may compute the amount of buffered small data per the other examples as described herein.

In certain representative embodiments, the WTRU 102 may measure a RSRP of one or more RSs. For example, the transmitting of the at least the portion of the UL SDT data present in the buffer using the SDT resource may be further conditioned on (4) the measured RSRP being greater than or equal to a second threshold at 250.

In certain representative embodiments, the WTRU 102 may perform a RA procedure (e.g., two-step or four-step RA) after receiving the information indicating the I-RNTI. The SDT resource used for transmission at 250 may be a RACH resource, such as a Msg3 PUSCH resource or another resource as described herein.

FIG. 3 is a representative procedure that may be implemented by a WTRU 102 to transmit a small data payload using a SDT resource. As shown in FIG. 3, a WTRU 102 may implement a procedure 200 to transmit SDT data using a SDT resource. At 310, the WTRU 102 may receive information indicating a configuration of one or more small data transmission (SDT) resources. At 320, the WTRU 102 may receive information indicating one or more data radio bearers (DRBs) which support SDT. At 330, the WTRU 102 may receive information indicating an inactive radio net-work temporary identifier (I-RNTI) (e.g., to indicate to transition to inactive mode). In certain representative embodiments, any of 310, 320 and/or 330 may be combined and/or reordered. At 340, the WTRU 102 may determine whether uplink (UL) SDT data for transmission is present in a buffer of the WTRU 102. At 250, on condition that (1) the UL SDT data is determined to be present in the buffer, (2) a size of the UL SDT data present in the buffer is less than a first threshold, and (3) the UL SDT data present in the buffer is for the one or more DRBs which support SDT, the WTRU 102 may, after receiving the information indicating the I-RNTI, transmit the UL SDT data present in the buffer using a SDT resource from among the one or more SDT resources. The SDT resource may, for example, be any of an UL grant provided in Msg2, a Msg3 PUSCH resource, an UL grant provided in Msg4, a MsgA PUSCH resource, an UL grant provided in MsgB, a CFRA resource, or a CG resource as described herein.

In certain representative embodiments, the WTRU 102 may consider whether the amount of all the UL SDT data present in the buffer is less than the first threshold and whether all the UL SDT data present in the buffer is for the one or more DRBs which support SDT at 340. In other representative embodiments, the WTRU 102 may compute the amount of buffered small data per the other examples as described herein.

In certain representative embodiments, the WTRU 102 may measure a RSRP of one or more RSs. For example, the transmitting of the at least the portion of the UL SDT data present in the buffer using the SDT resource may be further conditioned on (4) the measured RSRP being greater than or equal to a second threshold at 350.

In certain representative embodiments, the WTRU 102 may perform a RA procedure (e.g., two-step or four-step RA) after receiving the information indicating the I-RNTI. The SDT resource used for transmission at 250 may be a RACH resource, such as a Msg3 PUSCH resource or another resource as described herein.

In certain representative embodiments, the WTRU 102 may, after the transmitting of the at least the portion of the UL SDT data present in the buffer using the SDT resource at 250 or 350, send a request to resume a RRC connection to a RAN.

FIG. 4. is a representative procedure that may be implemented by a WTRU using a SDT resource to determine whether or not to transition to connected mode. As shown in FIG. 4, a WTRU 102 may implement a procedure 400 to transition to connected mode (e.g., from inactive mode). At 410, the WTRU 102 may receive information indicating a configuration of one or more small data transmission (SDT) resources. At 420, the WTRU 102 may receive information indicating one or more data radio bearers (DRBs) which support SDT. At 430, the WTRU 102 may receive information indicating an inactive radio network temporary identifier (I-RNTI) (e.g., to indicate to transition to inactive mode). In certain representative embodiments, any of 410, 420 and/or 4330 may be combined and/or reordered. At 440, the WTRU 102 may determine whether uplink (UL) SDT data for transmission is present in a buffer of the WTRU 102. At 450, the WTRU 102 may, on condition that (1) at least a portion of the UL SDT data present in the buffer is for a DRB which does not support SDT, or (2) the UL SDT data present in the buffer is for the one or more DRBs which support SDT and a size of the UL SDT data present in the buffer is greater than or equal to a first threshold, send a request to resume a radio resource control (RRC) connection to a radio access network (RAN), the request to resume the RRC connection may include the information indicating the I-RNTI.

In certain representative embodiments, the WTRU 102 may consider whether the amount of all the UL SDT data present in the buffer is less than the first threshold and whether all the UL SDT data present in the buffer is for the one or more DRBs which support SDT at 340. In other representative embodiments, the WTRU 102 may compute the amount of buffered small data per the other examples as described herein.

In certain representative embodiments, the WTRU 102 may measure a RSRP of one or more RSs. For example, the sending of the request to resume the RRC connection may be further conditioned on (4) the measured RSRP being less than a second threshold at 450.

FIG. 5 is a representative procedure that may be implemented by a WTRU 102 to transmit a small data payload using a SDT resource. As shown in FIG. 5, a WTRU 102 may implement a procedure 200 to transmit SDT data using a SDT resource. At 510, the WTRU 102 may receive information indicating a configuration of one or more small data transmission (SDT) resources. At 520, the WTRU 102 may receive information indicating one or more data radio bearers (DRBs) which support SDT. At 530, the WTRU 102 may receive information indicating an inactive radio network temporary identifier (I-RNTI) (e.g., to indicate to transition to inactive mode). In certain representative embodiments, any of 510, 520 and/or 530 may be combined and/or reordered. At 540, the WTRU 102 may measure a RSRP of one or more RSs. At 550, the WTRU 102 may determine whether uplink (UL) SDT data for transmission is present in a buffer of the WTRU 102. At 560, on condition that (1) the UL SDT data is determined to be present in the buffer, (2) a size of the UL SDT data present in the buffer is less than a first threshold, (3) the UL SDT data present in the buffer is for the one or more DRBs which support SDT, and (4) the measured RSRP is greater than or equal to a second threshold, the WTRU 102 may, after receiving the information indicating the I-RNTI, transmit at least a portion of the UL SDT data present in the buffer using a SDT resource from among the one or more SDT resources. The SDT resource may, for example, be any of an UL grant provided in Msg2, a Msg3 PUSCH resource, an UL grant provided in Msg4, a MsgA PUSCH resource, an UL grant provided in MsgB, a CFRA resource, or a CG resource as described herein.

FIG. 6 is a representative procedure that may be implemented by a WTRU using a SDT resource to determine whether or not to transition to connected mode. As shown in FIG. 6, a WTRU 102 may implement a procedure 600 to transition to connected mode. At 610, the WTRU 102 may receive information indicating a configuration of one or more small data transmission (SDT) resources. At 620, the WTRU 102 may receive information indicating one or more data radio bearers (DRBs) which support SDT. At 630, the WTRU 102 may receive information indicating an inactive radio network temporary identifier (I-RNTI) (e.g., to indicate to transition to inactive mode). In certain representative embodiments, any of 610, 620 and/or 630 may be combined and/or reordered. At 640, the WTRU 102 may measure a RSRP of one or more RSs. At 650, on condition that (1) at least a portion of the UL SDT data present in the buffer is for a DRB which does not support SDT, or (2) the UL SDT data present in the buffer is for the one or more DRBs which support SDT and a size of the UL SDT data present in the buffer is greater than or equal to a first threshold, or (4) the measured RSRP is less than a second threshold, the WTRU 102 may send a request to resume a radio resource control (RRC) connection to a radio access network (RAN). The request to resume the RRC connection may include the information indicating the I-RNTI.

Figures 7, 8:
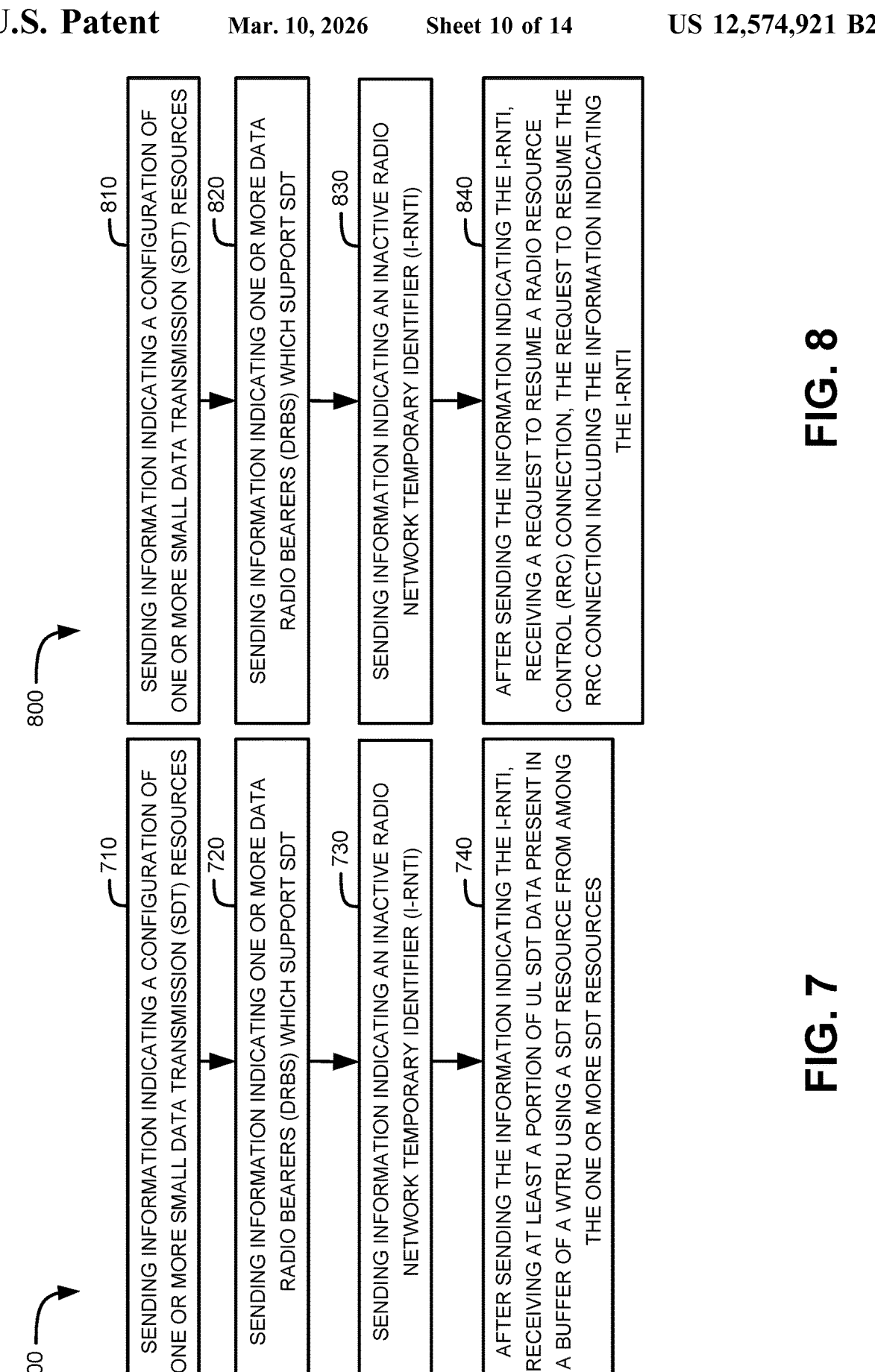
FIG. 7 is a representative procedure that may be implemented by a base station to receive a small data payload using a SDT resource from a WTRU.
FIG. 8 is a representative procedure that may be implemented by a base station to transition a WTRU to connected mode.

FIG. 7 is a representative procedure that may be implemented by a base station to receive a small data payload using a SDT resource from a WTRU in inactive mode. As shown in FIG. 7, a base station (e.g., gNB 180) may implement a procedure to receive a SDT payload (e.g., from a WTRU 102). At 710, the gNB 180 may send information indicating a configuration of one or more small data transmission (SDT) resources. At 720, the gNB 180 may send information indicating one or more data radio bearers (DRBs) which support SDT. At 730, the gNB 180 may send information indicating an inactive radio network temporary identifier (I-RNTI) (e.g., to indicate to transition to inactive mode). In certain representative embodiments, any of 710, 720 and/or 730 may be combined and/or reordered. At 740, the gNB 180 may, after sending the information indicating the I-RNTI, receive at least a portion of UL SDT data present in a buffer of a WTRU 102 using a SDT resource from among the one or more SDT resources. The SDT resource may, for example, be any of an UL grant provided in Msg2, a Msg3 PUSCH resource, an UL grant provided in Msg4, a MsgA PUSCH resource, an UL grant provided in MsgB, a CFRA resource, or a CG resource as described herein.

FIG. 8 is a representative procedure that may be implemented by a base station to transition a WTRU to connected mode. As shown in FIG. 8, a base station (e.g., gNB 180) may implement a procedure 800 to transition (e.g., begin to transition) a WTRU 102 from inactive mode to connected mode. At 810, the gNB 180 may send information indicating a configuration of one or more small data transmission (SDT) resources. At 820, the gNB 180 may send information indicating one or more data radio bearers (DRBs) which support SDT. At 830, the gNB 180 may send information indicating an inactive radio network temporary identifier (I-RNTI) (e.g., to indicate to transition to inactive mode). In certain representative embodiments, any of 810, 820 and/or 830 may be combined and/or reordered. At 840, the gNB 180 may after sending the information indicating the I-RNTI, receive a request to resume a radio resource control (RRC) connection to a radio access network (RAN). The request to resume the RRC connection may include the information indicating the I-RNTI.

FIG. 9 is a representative procedure that may be implemented by a WTRU to determine whether or not to transition to connected mode. As shown in FIG. 9, a WTRU 102 may implement a procedure 900 to transition (e.g., begin to transition) from inactive mode to connected mode. At 910, the WTRU 102 may receive the WTRU 102 may receive information indicating a configuration of one or more small data transmission (SDT) resources. At 920, the WTRU 102 may receive information indicating a configuration of one or more small data transmission (SDT) resources. At 930, the WTRU 102 may receive information indicating an inactive radio network temporary identifier (I-RNTI) (e.g., to indicate to transition to inactive mode). In certain representative embodiments, any of 910, 920 and/or 930 may be combined and/or reordered. The WTRU 102 may, after receiving the information indicating the I-RNTI, transmit at least a portion of UL SDT data present in a buffer of the WTRU using a SDT resource from among the SDT resources. The SDT resource may, for example, be any of an UL grant provided in Msg2, a Msg3 PUSCH resource, an UL grant provided in Msg4, a MsgA PUSCH resource, an UL grant provided in MsgB, a CFRA resource, or a CG resource as described herein. At 950, the WTRU 102 may determine whether or not the transmission of the at least the portion of the UL SDT data has been successfully received. On condition that the transmission of the at least the portion of the UL SDT data is determined not to have been successfully received for a configured or predetermined amount of time from the transmission of the at least the portion of the UL SDT data, the WTRU 102 may send a request to resume or re-establish a RRC connection to a RAN at 960.

FIG. 10 is a representative procedure that may be implemented by a base station to transition a WTRU to connected mode. As shown in FIG. 10, a base station (e.g., gNB 180) may implement a procedure 1000 to transition (e.g., begin to transition) a WTRU 102 from inactive mode to connected mode. At 1010, the gNB 180 may send information indicating a configuration of one or more small data transmission (SDT) resources. At 1020, the gNB 180 may send information indicating one or more data radio bearers (DRBs) which support SDT. At 1030, the gNB 180 may send information indicating an inactive radio network temporary identifier (I-RNTI) (e.g., to indicate to transition to inactive mode). In certain representative embodiments, any of 1101, 1020 and/or 1030 may be combined and/or reordered. At 1040, the gNB 180 may determine whether an UL SDT data transmission is received or not using one of the SDT resources. For example, any of the examples described herein may be used to determine whether or not the UL SDT data payload has been received (e.g., successfully or not). At 1050, the gNB 180 may, on condition that at least a portion of the UL SDT data transmission has not been received, send information indicating that at least the portion of the UL SDT data transmission has not been received. At 1060, the gNB 180 may receive (e.g., from the WTRU 102) a request to resume or re-establish a RRC connection.

FIG. 11 is a representative procedure that may be implemented by a WTRU to transmit a small data payload using a contention-free random access (CFRA) resource. As shown in FIG. 11, a WTRU 102 may implement a procedure 1100 to transmit a small data payload using a CFRA resource in inactive mode. At 1110, the WTRU 102 may receive information indicating a configuration of one or more small data transmission (SDT) resources. At 1120, the WTRU 102 may receive information indicating one or more data radio bearers (DRBs) which support SDT. At 1130, the WTRU 102 may receive information indicating an inactive radio network temporary identifier (I-RNTI) (e.g., to indicate to transition to inactive mode). In certain representative embodiments, any of 1110, 1120 and/or 1130 may be combined and/or reordered. At 1140, the WTRU 102 may determine whether uplink (UL) SDT data for transmission is present in a buffer of the WTRU 102. At 1150, the WTRU 102 may, after receiving the information indicating the I-RNTI, transmit at least a portion of the UL SDT data present in the buffer using a CFRA resource from among the one or more SDT resources based on any of (1) quality of service (QoS) information associated with the UL SDT data present in the buffer and/or (2) a measured channel condition. For example, the QoS information may include a latency requirement which is associated with the UL SDT data present in the buffer. As another example, the measured channel condition may include any of an RSRP, a RSRQ and/or a SINR. At 1140, the CFRA resource may be used, for example, on further condition that the latency requirement is less than a first threshold and/or that measured channel condition is greater than a second threshold.

FIG. 12 is a representative procedure that may be implemented by a base station to receive a small data payload using a contention-free random access (CFRA) resource. As shown in FIG. 12, a base station (e.g., gNB 180) may implement a procedure 1200 to receive a small data payload using a contention-free random access (CFRA) resource. At 1210, the gNB 180 may send information indicating a configuration of one or more small data transmission (SDT) resources. At 1220, the gNB 180 may send information indicating one or more data radio bearers (DRBs) which support SDT. At 1230, the gNB 180 may send information indicating an inactive radio network temporary identifier (I-RNTI) (e.g., to indicate to transition to inactive mode). In certain representative embodiments, any of 1210, 1220 and/or 1230 may be combined and/or reordered. The one or more SDT resources may include one or more CFRA resources as described herein. At 1240, the base station may, after sending the information indicating the I-RNTI, receive an UL SDT data transmission using one of the CFRA resources at 1240.

In certain representative embodiments, the procedures 200 to 1200 shown in FIGS. 2 to 12 may be performed during a RA procedure (e.g., two-step or four-step RA), such as after transitioning to inactive mode as described herein. For example, one or more SDT resources may be provided in Msg2 or Msg4 of a four-step RA procedure or may be provided in MsgB of a two-step RA procedure as described herein. As another example, the WTRU 102 may use a CG resource as a SDT resource to transmit a SDT payload as described herein. In certain representative embodiments, the WTRU 102 may transmit UL SDT data using a SDT resource while in inactive mode and upon determining that certain condition have been met as described herein. In other representative embodiments, the WTRU 102 may send a request to resume (or re-establish) a RRC connection upon determining that certain other conditions have been met as described herein.

In certain representative embodiments, a method for resource-efficient transmission may include operating in one of an idle mode or an inactive mode, and transmitting, in response to one of a random access (RA) message or a configured grant (CG), a small data transmission over an uplink channel while in one of the idle mode or the inactive mode.

In certain representative embodiments, the method for resource-efficient transmission may include, prior to transmitting the small data transmission over the uplink channel, transitioning from the idle mode or the inactive mode to a connected mode in response to any of a received configuration, a measurement event, a received data transmission, an amount of small data to be transmitted, and/or upon determining a payload characteristic of the small data for transmission.

In certain representative embodiments, the method for resource-efficient transmission may include determining the amount of small data in a buffer based on a number of bits in the buffer for any of a dedicated radio bearer, a logical channel, and/or a time period.

In certain representative embodiments, the method for resource-efficient transmission may include determining the amount of small data in a buffer to be transmitted associated with one or more protocol layers.

In certain representative embodiments, the method for resource-efficient transmission may include determining the amount of small data to be transmitted as a difference from a previous reported small data amount.

In certain representative embodiments, the method for resource-efficient transmission may include transmitting a small data volume report including an amount of small data to be transmitted. For example, the small data volume report may be included in any of a media access control (MAC) control element (CE), a MAC subheader, or a radio resource control (RRC) message.

In certain representative embodiments, the RA message is received during one of a two-step RA procedure or a four-step RA procedure.

In certain representative embodiments, the method for resource-efficient transmission may include determining resources for transmitting the small data transmission based on a received signal or based on one or more conditions.

In certain representative embodiments, the method for resource-efficient transmission may include determining whether the small data transmission was successfully received based on any of a received message, a Hybrid Acknowledgment Repeat Request (HARQ) acknowledgement, an implicit indication, a layer 2 command, or expiration of a timer.

In certain representative embodiments, the method for resource-efficient transmission may include retransmitting, on a condition the small data transmission was not received, the small data transmission.

In certain representative embodiments, the method for resource-efficient transmission may include retransmitting, upon condition that the small data transmission was determined to not have been successfully received, of small data using different resources than those used for the small data transmission over the uplink channel.

In certain representative embodiments, the timer may be associated with any of a respective media access control entity, a respective dedicated radio bearer, or a respective HARQ process.

In certain representative embodiments, the transmitting of the small data transmission further includes segmenting a small data packet into a plurality of small data packets and transmitting the small data packets in a plurality of transmission opportunities.

In certain representative embodiments, the method for resource-efficient transmission may include receiving a configuration for contention free resources and selecting, based on one or more criteria, a subset of the contention free resources for transmitting the small data transmission.

In certain representative embodiments, the method for resource-efficient transmission may include receiving an indication to suspend, resume or toggle small data transmission using at least a part of the contention free resources, wherein the indication is included in any of downlink control information (DCI), a media access control (MAC) control element, a downlink transmission, a layer 1 (L1) payload, or a layer 2 (L2) payload.

In certain representative embodiments, the method for resource-efficient transmission may include suspending a small data transmission procedure for at least a part of the contention free resources; and after expiration of a timer, resuming the small data transmission procedure using the contention free resources.

In certain representative embodiments, the method for resource-efficient transmission may include receiving a configuration with a set of Hybrid Acknowledgment Repeat Request (HARQ) processes, and determining to use at least one of the HARQ processes for the small data transmission.

In certain representative embodiments, the method for resource-efficient transmission may include operating in at least one of an IDLE or INACTIVE state, performing channel quality measurements, and transmitting the measured channel quality while remaining in the at least one of the IDLE or INACTIVE state.

In certain representative embodiments, a wireless transmit/receive unit (WTRU) may be configured to perform at least part of the methods for resource-efficient transmission as described herein.

In certain representative embodiments, a system, which includes a transmitter and a receiver, may be configured to perform at least part of the methods for resource-efficient transmission as described herein.

In certain representative embodiments, a processor may be configured to perform at least part of the methods for resource-efficient transmission as described herein. In certain representative embodiments, a network element may be configured to perform at least part of the methods for resource-efficient transmission as described herein. In certain representative embodiments, a base station may be configured to perform at least part of the methods for resource-efficient transmission as described herein. In certain representative embodiments, an integrated circuit may be configured to perform at least part of the methods for resource-efficient transmission as described herein. In certain representative embodiments, a computing device may be configured to perform at least part of the methods for resource-efficient transmission as described herein. In certain representative embodiments, a non-transitory computer readable medium may store instructions that, when executed by a processor, cause the processor to perform at least part of the methods for resource-efficient transmission as described herein.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to Figures. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶6 or means-plus-function claim format, and any claim without the terms "means for" is not so intended.

What is claimed:

1. A method implemented by a wireless transmit/receive unit (WTRU), the method comprising:
   receiving configuration information indicating (i) a plurality of small data transmission (SDT) resources, (ii) one or more data radio bearers (DRBs) which support SDT, (iii) an inactive radio network temporary identifier (I-RNTI); and (iv) a time amount of a timing advance (TA) timer associated with SDT;
   on condition that (1) a size of UL SDT data present in a buffer of the WTRU is less than a first threshold, (2) the UL SDT data present in the buffer is for the one or more DRBs which support SDT, and (3) a reference signal received power (RSRP) is greater than a second threshold:
   selecting, based on the TA timer not expiring, a configured grant (CG) from among the plurality of SDT resources; and
   sending, using the selected CG, a first transmission that includes a radio resource control (RRC) resume message, the I-RNTI and at least a portion of the UL SDT data present in the buffer.

2. The method of claim 1, wherein at least part of the configuration information is received via radio resource control (RRC) signaling.

3. The method of claim 1, wherein the configuration information includes information indicating the first threshold and the second threshold.

4. The method of claim 1, further comprising:
   receiving a physical downlink control channel (PDCCH) transmission using a SDT search space,
   wherein the PDCCH transmission is associated with the first transmission and is scrambled by a cell radio network temporary identifier (C-RNTI).

5. The method of claim 4, further comprising:
   receiving configuration information indicating the SDT search space.

6. The method of claim 4, wherein the PDCCH transmission is received within a CG response window which starts at the sending of the first transmission.

7. The method of claim 1, further comprising:
   monitoring, in a SDT search space during a CG response window, for a physical downlink control channel (PDCCH) transmission associated with the first transmission and scrambled by a cell radio network temporary identifier (C-RNTI),
   wherein the CG response window starts at the sending of the first transmission.

8. The method of claim 7, further comprising:
   determining that the first transmission was unsuccessful based on the CG response window expiring without receiving the PDCCH transmission; and
   on condition that the first transmission was unsuccessful, resending at least the portion of the UL SDT data present in the buffer.

9. The method of claim 1, further comprising:
   determining the TA timer has not expired since reception of a TA command.

10. A wireless transmit/receive unit (WTRU) comprising:
    a processor and a transceiver which are configured to:
    receive configuration information indicating (i) a plurality of small data transmission (SDT) resources, (ii) one or more data radio bearers (DRBs) which support SDT, (iii) an inactive radio network temporary identifier (I-RNTI); and (iv) a time amount of a timing advance (TA) timer associated with SDT, on condition that (1) a size of UL SDT data present in a buffer of the WTRU is less than a first threshold, (2) the UL SDT data present in the buffer is for the one or more DRBs which support SDT, and (3) a reference signal received power (RSRP) is greater than a second threshold:

select, based on the TA timer not expiring, a configured grant (CG) from among the plurality of SDT resources, and send, using the selected CG, a first transmission that includes a radio resource control (RRC) resume message, the I-RNTI and at least a portion of the UL SDT data present in the buffer.

11. The WTRU of claim 10, wherein the configuration information is received via radio resource control (RRC) signaling.

12. The WTRU of claim 10, wherein the configuration information includes information indicating the first threshold and the second threshold.

13. The WTRU of claim 10, wherein the processor and the transceiver are configured to:

receive a physical downlink control channel (PDCCH) transmission using a SDT search space, and wherein the PDCCH transmission is associated with the first transmission and is scrambled by a cell radio network temporary identifier (C-RNTI).

14. The WTRU of claim 13, wherein the processor and transceiver are configured to:

receive configuration information indicating the SDT search space.

15. The WTRU of claim 13, wherein the PDCCH transmission is received within a CG response window which starts at the sending of the first transmission.

16. The WTRU of claim 10, wherein the processor and the transceiver are configured to:

monitor, in a SDT search space during a CG response window, for a physical downlink control channel (PDCCH) transmission associated with the first transmission and scrambled by a cell radio network temporary identifier (C-RNTI), and wherein the CG response window starts at the sending of the first transmission.

17. The WTRU of claim 16, wherein the processor and the transceiver are configured to:

determine that the first transmission was unsuccessful based on the CG response window expiring without receiving the PDCCH transmission, and on condition that the first transmission was unsuccessful, resend at least the portion of the UL SDT data present in the buffer.

18. The WTRU of claim 10, wherein the processor and the transceiver are configured to:

determine the TA timer has not expired since reception of a TA command.

19. The WTRU of claim 10, wherein at least part of the configuration information is received via broadcast signaling.

20. The method of claim 1, wherein at least part of the configuration information is received via broadcast signaling.

* * * * *